(12) United States Patent
Ness et al.

(10) Patent No.: US 9,452,547 B2
(45) Date of Patent: Sep. 27, 2016

(54) BLOCK MOLD HAVING MOVEABLE LINER

(75) Inventors: John T. Ness, Stillwater, MN (US); Jeffrey A. Ness, Oak Park Heights, MN (US)

(73) Assignee: Ness Inventions, Inc., St. Paul, MN (US)

( * ) Notice: Subject to any disclaimer, the term of this patent is extended or adjusted under 35 U.S.C. 154(b) by 87 days.

(21) Appl. No.: 13/396,245

(22) Filed: Feb. 14, 2012

(65) Prior Publication Data
US 2012/0187602 A1 Jul. 26, 2012

Related U.S. Application Data

(63) Continuation of application No. 12/795,354, filed on Jun. 7, 2010, now Pat. No. 8,113,815.

(60) Provisional application No. 61/184,572, filed on Jun. 5, 2009.

(51) Int. Cl.
| | | |
|---|---|---|
| *B28B 3/00* | (2006.01) | |
| *B28B 7/00* | (2006.01) | |
| *B28B 3/08* | (2006.01) | |
| *B29C 37/00* | (2006.01) | |
| *B28B 1/04* | (2006.01) | |

(Continued)

(52) U.S. Cl.
CPC .............. *B28B 7/0041* (2013.01); *B28B 1/04* (2013.01); *B28B 3/02* (2013.01); *B28B 3/08* (2013.01); *B28B 3/086* (2013.01); *B28B 15/005* (2013.01); *B28B 21/02* (2013.01); *B29C 37/0017* (2013.01)

(58) Field of Classification Search
CPC ..... B28B 7/0041; B28B 3/02; B28B 15/005; B28B 3/08; B28B 3/086; B28B 1/04; B28B 21/12; B29C 37/0017

USPC ........ 264/333, 334; 425/441, 139, 413, 421, 425/452; 249/161, 162

See application file for complete search history.

(56) References Cited

U.S. PATENT DOCUMENTS

| | | | |
|---|---|---|---|
| 779,976 A | | 1/1905 | Sterling |
| 815,372 A | * | 3/1906 | Palmer ........................ 249/162 |

(Continued)

FOREIGN PATENT DOCUMENTS

| | | |
|---|---|---|
| DE | 308276 | 10/1918 |
| DE | 3400349 | 7/1985 |

(Continued)

OTHER PUBLICATIONS

Search Report, PCT, mailed Oct. 21, 2010.

*Primary Examiner* — Yogendra Gupta
*Assistant Examiner* — Ninh Le
(74) *Attorney, Agent, or Firm* — Dicke, Billig & Czaja, PLLC

(57) ABSTRACT

A method of operating a mold assembly having a plurality of liner plates forming a mold cavity. The method includes driving a master drive element back and forth in a continuous loop about at least a portion of exterior perimeter sides of the mold cavity to provide a first and second linear forces in first and second directions substantially in parallel with each perimeter side of the mold cavity about which the primary drive element is routed, and driving a secondary drive element, which engages the at least one moveable liner plate, with the first and second linear forces to drive at least one moveable liner plate toward and away from the interior of the mold cavity.

6 Claims, 39 Drawing Sheets

(51) Int. Cl.
  *B28B 21/02* (2006.01)
  *B28B 3/02* (2006.01)
  *B28B 15/00* (2006.01)

(56) References Cited

U.S. PATENT DOCUMENTS

| | | | |
|---|---|---|---|
| 2,304,660 A | 12/1940 | Scott | |
| 2,526,198 A | 10/1950 | Clanton | |
| 3,488,817 A | 1/1970 | Katz | |
| 3,694,128 A | 9/1972 | Foxen | |
| 4,063,866 A | 12/1977 | Lurbiecki | |
| 4,869,660 A | 9/1989 | Ruckstuhl | |
| 5,846,576 A | 12/1998 | Braungardt et al. | |
| 6,349,522 B1 | 2/2002 | Stevens | |
| 6,470,762 B1 | 10/2002 | Burkart | |
| 6,923,636 B2* | 8/2005 | Langos et al. | 425/214 |
| 2002/0125403 A1* | 9/2002 | Braungardt et al. | 249/176 |
| 2003/0126821 A1 | 7/2003 | Scherer et al. | |
| 2003/0201558 A1* | 10/2003 | Robinson et al. | 264/40.4 |
| 2004/0065974 A1* | 4/2004 | Dantlgraber | 264/40.5 |
| 2005/0025853 A1* | 2/2005 | Ness | B28B 7/0041 425/441 |
| 2005/0120670 A1 | 6/2005 | Ness et al. | |
| 2005/0121830 A1* | 6/2005 | Ness | B28B 7/0014 264/293 |
| 2006/0179779 A1* | 8/2006 | Ness | B28B 1/008 52/596 |
| 2006/0185309 A1* | 8/2006 | Ness | B28B 7/0041 52/596 |
| 2006/0191231 A1* | 8/2006 | Ness | B28B 7/0041 52/596 |
| 2006/0257516 A1* | 11/2006 | Ness | B28B 7/0041 425/411 |
| 2008/0304945 A1* | 12/2008 | Hlinka | 414/307 |
| 2009/0103987 A1 | 4/2009 | MacDonald | |
| 2009/0120705 A1* | 5/2009 | McKinzie | 180/181 |
| 2009/0295043 A1* | 12/2009 | Kolbet | 264/505 |
| 2009/0304838 A1* | 12/2009 | Ness | B28B 7/0041 425/144 |

FOREIGN PATENT DOCUMENTS

| | | | |
|---|---|---|---|
| DE | 4140093 | | 6/1993 |
| FR | 325172 | | 4/1903 |
| FR | 325172 A | * | 4/1903 |
| FR | 2343570 | | 10/1977 |
| FR | 2357346 | | 2/1978 |
| GB | 162346 | | 5/1921 |
| GB | 1381114 | | 1/1975 |
| JP | 63029403 | | 2/1988 |
| WO | 02051604 | | 7/2002 |

* cited by examiner

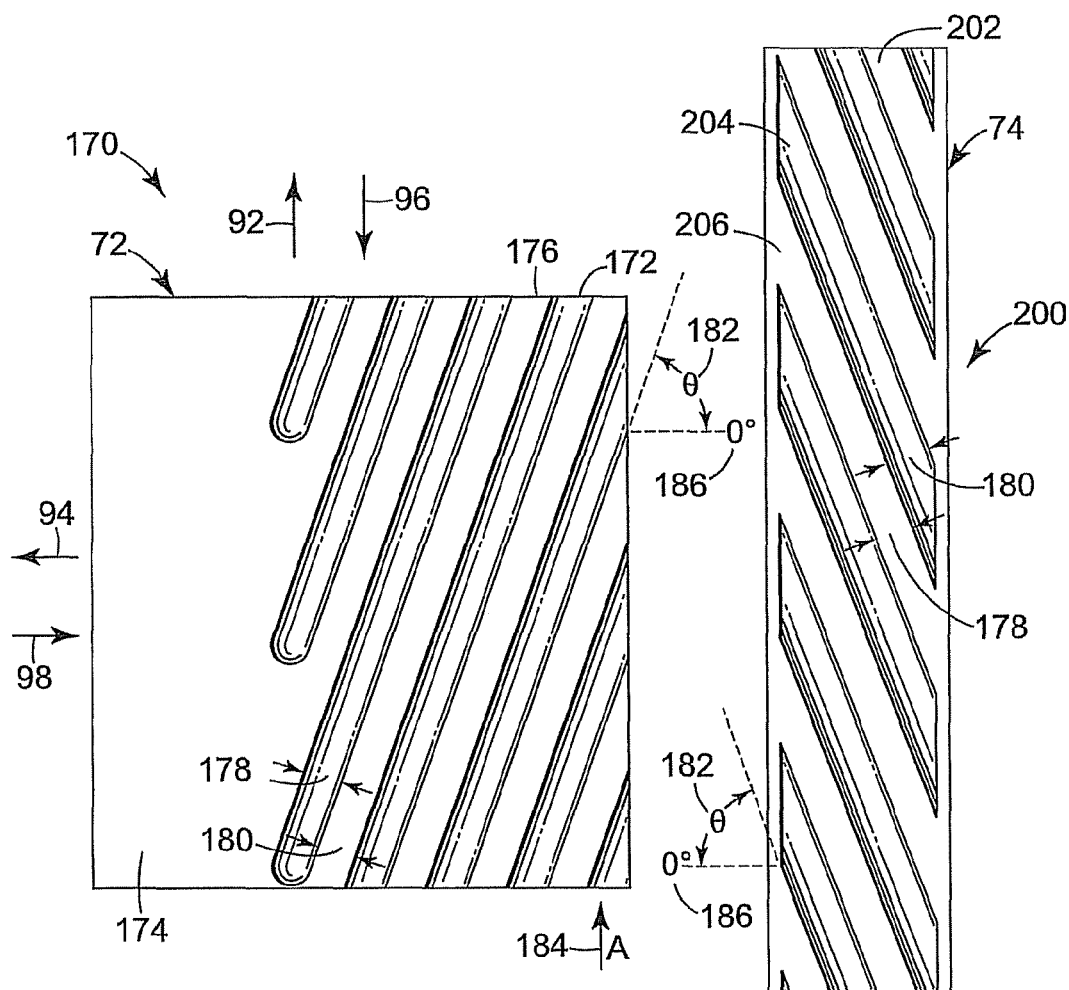
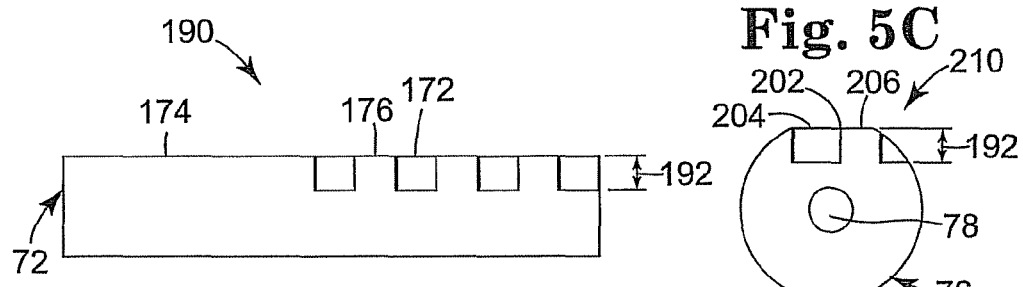
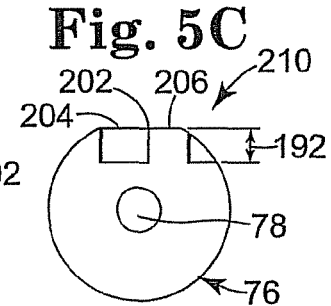
Fig. 5A
Fig. 5B
Fig. 5C
Fig. 5D

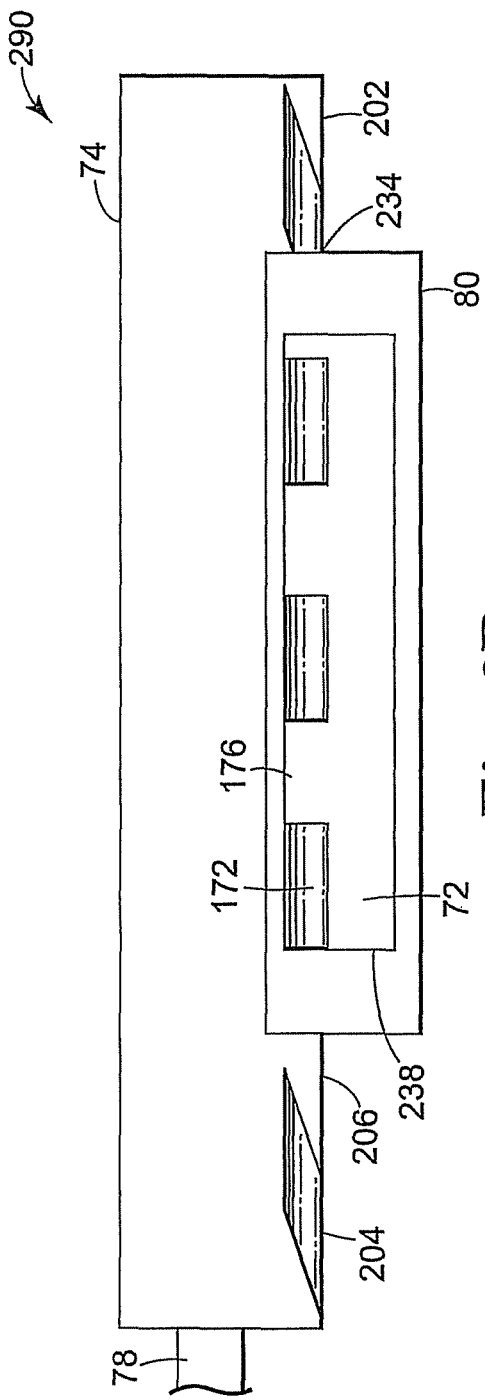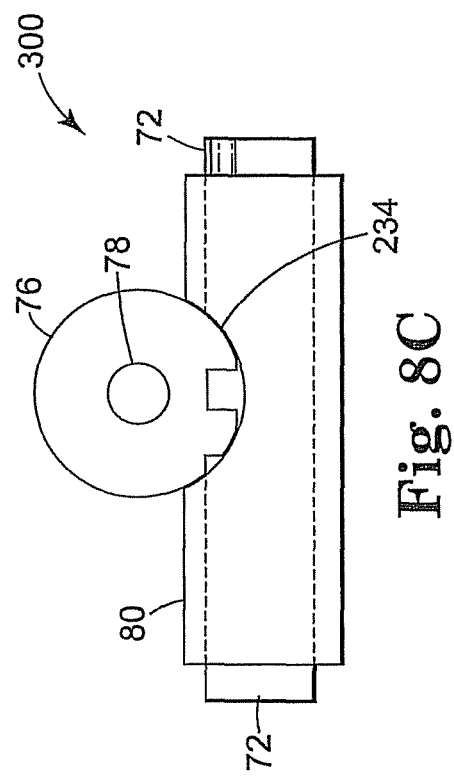

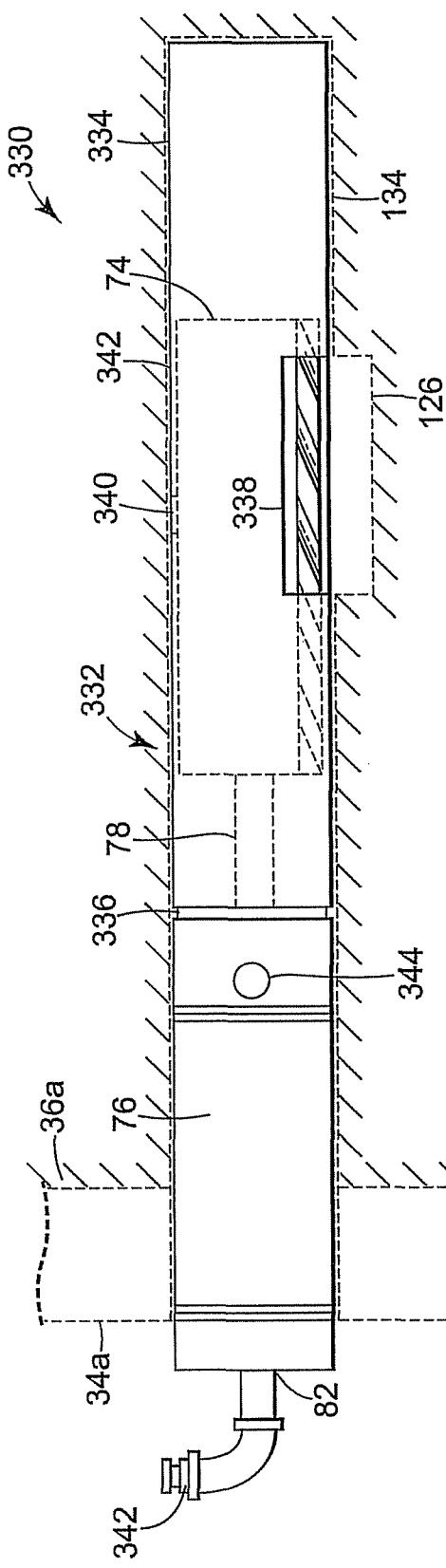
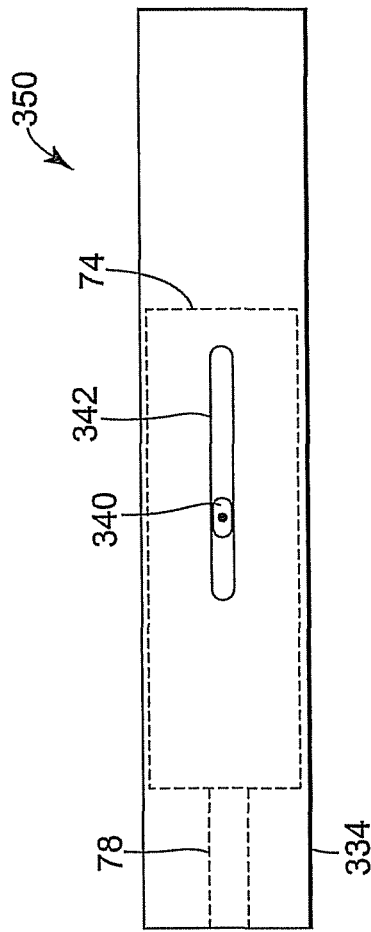
Fig. 10A
Fig. 10B

BLOCK MOLD HAVING MOVEABLE LINER

CROSS-REFERENCE TO RELATED APPLICATIONS

This Utility Patent Application is a continuation of U.S. patent application Ser. No. 12/795,354, filed Jun. 7, 2010, which claimed priority from U.S. Provisional Patent Application No. 61/184,572, filed on Jun. 5, 2009, both of which are incorporated herein by reference.

BACKGROUND OF THE INVENTION

Concrete blocks, also referred to as concrete masonry units (CMUs), are typically manufactured by forming them into various shapes using a concrete block machine employing a mold frame assembled so as to form a mold box. A mold cavity having a negative of a desired shape of the block to be formed is provided within the mold box. A support board, or pallet, is moved via a conveyor system onto a pallet table. The pallet table is moved upward until the pallet contacts and forms a bottom of the mold box. The cavity is then filled with concrete by a moveable feedbox drawer.

As soon as the mold is filled with concrete, the feedbox drawer is moved back to a storage position and a plunger, or head shoe assembly, descends to form a top of the mold. The head shoe assembly is typically matched to the top outside surface of the mold cavity and is hydraulically or mechanically pressed down on the concrete. The head shoe assembly compresses the concrete to a desired pounds-per-square-inch (psi) rating and block dimension while simultaneously vibrating the mold along with the vibrating table, resulting in substantial compression and optimal distribution of the concrete throughout the mold cavity.

Because of the compression, the concrete reaches a level of hardness that permits immediate stripping of the finished block from the mold. To remove the finished block from the mold, the mold remains stationary while the shoe and pallet table, along with the corresponding pallet, are moved downward and force the block from the mold onto the pallet. As soon as the bottom edge of the head shoe assembly clears the bottom edge of the mold, the conveyor system moves the pallet with the finished block forward, and another pallet takes its place under the mold. The pallet table then raises the next pallet to form a bottom of the mold box for the next block, and the process is repeated.

For many types of CMU's (e.g., pavers, patio blocks, light weight blocks, cinder blocks, etc.), but for retaining wall blocks and architectural units in particular, it is desirable for at least one surface of the block to have a desired texture, such as a stone-like texture. One technique for creating a desired texture on the block surface is to provide a negative of a desired pattern or texture on the side walls of the mold. However, because of the way finished blocks are vertically ejected from the mold, any such pattern or texture would be stripped from the side walls unless they are moved away from the mold interior prior to the block being ejected.

One technique employed for moving the sidewalls of a mold involves the use of a cam mechanism to move the sidewalls of the mold inward and an opposing spring to push the sidewalls outward from the center of the mold. However, this technique applies an "active" force to the sidewall only when the sidewall is being moved inward and relies on the energy stored in the spring to move the sidewall outward. The energy stored in the spring may potentially be insufficient to retract the sidewall if the sidewall sticks to the concrete. Additionally, the cam mechanism can potentially be difficult to utilize within the limited confines of a concrete block machine.

A second technique involves using a piston to extend and retract the sidewall. However, a shaft of the piston shaft is coupled directly to the moveable sidewall and moves in-line with the direction of movement of the moveable sidewall. Thus, during compression of the concrete by the head shoe assembly, an enormous amount of pressure is exerted directly on the piston via the piston shaft. Consequently, a piston having a high psi rating is required to hold the sidewall in place during compression and vibration of the concrete. Additionally, the direct pressure on the piston shaft can potentially cause increased wear and shorten the expected life of the piston.

SUMMARY OF THE INVENTION

One embodiment provides a method of operating a mold assembly in an automated dry-cast block machine, the mold including a plurality of liner plates forming a mold cavity, each liner plate forming a perimeter side of the mold cavity, and at least one liner plate being moveable horizontally toward and away from an interior of the mold cavity, the mold cavity having an open top and open bottom in directions which are vertical relative to the movement of the at least one moveable liner plate, the method including driving a master drive element back and forth in a continuous loop about at least a portion of exterior perimeter sides of the mold cavity to provide a first linear force in a first horizontal direction and a second linear force in a second horizontal direction opposite the first horizontal direction substantially in parallel with each perimeter side about which the primary drive element is routed, and driving a secondary drive element, which engages the at least one moveable liner plate, with the first and second linear forces to drive the at least one moveable liner plate horizontally toward and away from the interior of the mold cavity.

BRIEF DESCRIPTION OF THE DRAWINGS

FIG. 5A illustrates a top view of one exemplary embodiment of a gear plate according to the present invention.

FIG. 5B illustrates an end view of the gear plate illustrated by FIG. 5A.

FIG. 5C illustrates a bottom view of one exemplary embodiment of a gear head according to the present invention.

FIG. 5D illustrates an end view of the gear head of FIG. 5C.

FIG. 8B is a side view of the illustration of FIG. 8A.

FIG. 8C is an end view of the illustration of FIG. 8A.

FIG. 10A is a diagram illustrating one exemplary embodiment of drive unit according to the present invention.

FIG. 10B is a partial top view of the drive unit of the illustration of FIG. 10A.

DESCRIPTION OF THE PREFERRED EMBODIMENTS

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
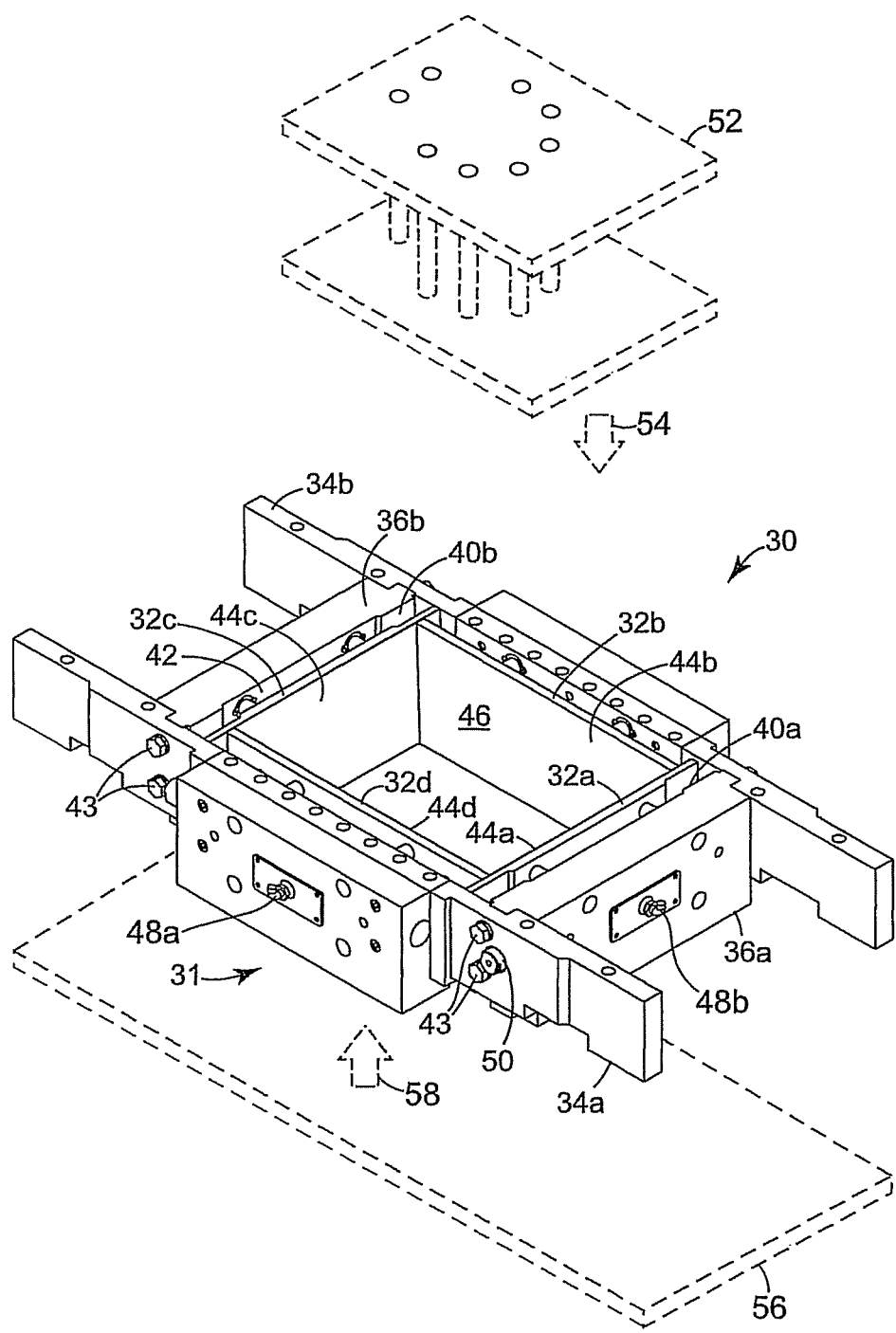
FIG. 1 is a perspective view of one exemplary embodiment of a mold assembly having moveable liner plates according to the present invention.

FIG. 1 is a perspective view of one exemplary embodiment of a mold assembly 30 having moveable liner plates 32a, 32b, 32c and 32d according to the present invention. Mold assembly 30 includes a drive system assembly 31 having side-members 34a and 34b and cross-members 36a and 36b, respectively having an inner wall 38a, 38b, 40a, and 40b, and coupled to one another such that the inner surfaces form a mold box 42. In the illustrated embodiment, cross members 36a and 36b are bolted to side members 34a and 34b with bolts 37.

Moveable liner plates 32a, 32b, 32c, and 32d, respectively have a front surface 44a, 44b, 44c, and 44d configured so as to form a mold cavity 46. In the illustrated embodiment, each liner plate has an associated gear drive assembly located internally to an adjacent mold frame member. A portion of a gear drive assembly 50 corresponding to liner plate 32a and located internally to cross-member 36a is shown extending through side-member 34a. Each gear drive assembly is selectively coupled to its associated liner plate and configured to move the liner plate toward the interior of mold cavity 46 by applying a first force in a first direction parallel to the associated cross-member, and to move the liner plate away from the interior of mold cavity 46 by applying a second force in a direction opposite the first direction. Side members 34a and 34b and cross-members 36a and 36b each have a corresponding lubrication port that extends into the member and provides lubrication to the corresponds gear elements. For example, lubrication ports 48a and 48b. The gear drive assembly and moveable liner plates according to the present invention are discussed in greater detail below.

In operation, mold assembly 30 is selectively coupled to a concrete block machine. For ease of illustrative purposes, however, the concrete block machine is not shown in FIG. 1. In one embodiment, mold assembly 30 is mounted to the concrete block machine by bolting side members 34a and 34b of drive system assembly 31 to the concrete block machine. In one embodiment, mold assembly 30 further includes a head shoe assembly 52 having dimensions substantially equal to those of mold cavity 46. Head shoe assembly 52 is also configured to selectively couple to the concrete block machine.

Liner plates 32a through 32d are first extended a desired distance toward the interior of mold box 42 to form the desired mold cavity 46. A vibrating table on which a pallet 56 is positioned is then raised (as indicated by directional arrow 58) such that pallet 56 contacts and forms a bottom to mold cavity 46. In one embodiment, a core bar assembly (not shown) is positioned within mold cavity 46 to create voids within the finished block in accordance with design requirements of a particular block.

Mold cavity 46 is then filled with concrete from a moveable feedbox drawer. Head shoe assembly 52 is then lowered (as indicated by directional arrow 54) onto mold 46 and hydraulically or mechanically presses the concrete. Head shoe assembly 52 along with the vibrating table then simultaneously vibrate mold assembly 30, resulting in a high compression of the concrete within mold cavity 46. The high level of compression fills any voids within mold cavity 46 and causes the concrete to quickly reach a level of hardness that permits immediate removal of the finished block from mold cavity 46.

The finished block is removed by first retracting liner plates 32a through 32d. Head shoe assembly 52 and the vibrating table, along with pallet 56, are then lowered (in a direction opposite to that indicated by arrow 58), while mold assembly 30 remains stationary so that head shoe assembly 56 pushes the finished block out of mold cavity 46 onto pallet 52. When a lower edge of head shoe assembly 52 drops below a lower edge of mold assembly 30, the conveyer system moves pallet 56 carrying the finished block away and a new pallet takes its place. The above process is repeated to create additional blocks.

By retracting liner plates 32a through 32b prior to removing the finished block from mold cavity 46, liner plates 32a through 32d experience less wear and, thus, have an increased operating life expectancy. Furthermore, moveable liner plates 32a through 32d also enables a concrete block to be molded in a vertical position relative to pallet 56, in lieu of the standard horizontal position, such that head shoe assembly 52 contacts what will be a "face" of the finished concrete block. A "face" is a surface of the block that will be potentially be exposed for viewing after installation in a wall or other structure.

Figure 2:
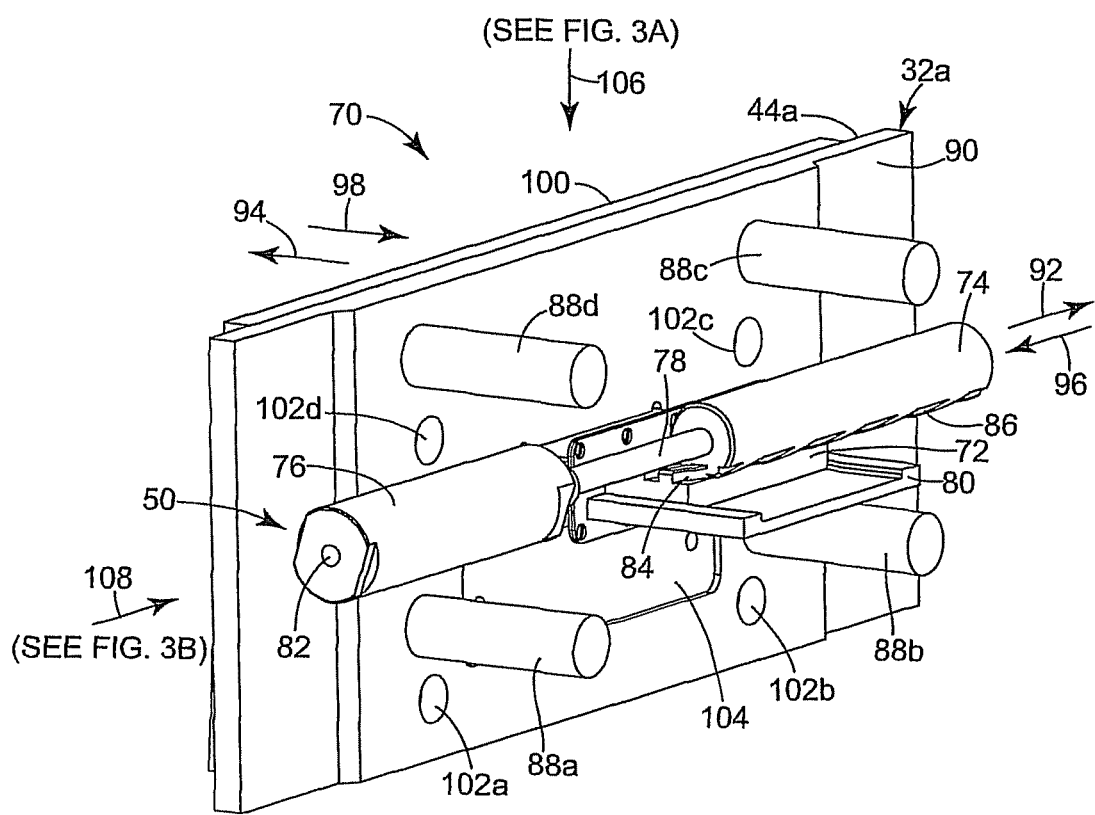
FIG. 2 is a perspective view of one exemplary embodiment of a gear drive assembly and moveable liner plate according to the present invention.

FIG. 2 is a perspective view 70 illustrating a moveable liner plate and corresponding gear drive assembly according to the present invention, such as moveable liner plate 32a and corresponding gear drive assembly 50. For illustrative purposes, side member 34a and cross-member 36 are not shown. Gear drive assembly 50 includes a first gear element 72 selectively coupled to liner plate 32a, a second gear element 74, a single rod-end double-acting pneumatic cylinder (cylinder) 76 coupled to second gear element 74 via a piston rod 78, and a gear track 80. Cylinder 76 includes an aperture 82 for accepting a pneumatic fitting. In one embodiment, cylinder 76 comprises a hydraulic cylinder. In one embodiment, cylinder 76 comprises a double rod-end dual-acting cylinder. In one embodiment, piston rod 78 is threadably coupled to second gear element 74.

In the embodiment of FIG. 2, first gear element 72 and second gear element 74 are illustrated and hereinafter referred to as a gear plate 72 and second gear element 74, respectively. However, while illustrated as a gear plate and a cylindrical gear head, first gear element 72 and second gear element 74 can be of any suitable shape and dimension.

Gear plate 72 includes a plurality of angled channels on a first major surface 84 and is configured to slide in gear track 80. Gear track 80 slidably inserts into a gear slot (not shown) extending into cross member 36a from inner wall 40a. Cylindrical gear head 74 includes a plurality of angled channels on a surface 86 adjacent to first major surface 84 of female gear plate 72, wherein the angled channels are tangential to a radius of cylindrical gear head 74 and configured to slidably mate and interlock with the angled channels of gear plate 72. Liner plate 32a includes guide posts 88a, 88b, 88c, and 88d extending from a rear surface 90. Each of the guide posts is configured to slidably insert into a corresponding guide hole (not shown) extending into cross member 36a from inner wall 40a. The gear slot and guide holes are discussed in greater detail below.

When cylinder 76 extends piston rod 78, cylindrical gear head 74 moves in a direction indicated by arrow 92 and, due to the interlocking angled channels, causes gear plate 72 and, thus, liner plate 32a to move toward the interior of mold 46 as indicated by arrow 94. It should be noted that, as illustrated, FIG. 2 depicts piston rod 78 and cylindrical gear head 74 in an extended position. When cylinder 76 retracts piston rod 78, cylindrical gear head 74 moves in a direction indicated by arrow 96 causing gear plate 72 and liner plate 32 to move away from the interior of the mold as indicated by arrow 98. As liner plate 32a moves, either toward or away from the center of the mold, gear plate 72 slides in guide track 80 and guide posts 88a through 88d slide within their corresponding guide holes.

In one embodiment, a removable liner face 100 is selectively coupled to front surface 44a via fasteners 102a, 102b, 102c, and 102d extending through liner plate 32a. Removable liner face 100 is configured to provide a desired shape and/or provide a desired imprinted pattern, including text, on a block made in mold 46. In this regard, removable liner face 100 comprises a negative of the desired shape or pattern. In one embodiment, removable liner face 100 comprises a polyurethane material. In one embodiment, removable liner face 100 comprises a rubber material. In one embodiment, removable liner plate comprises a metal or metal alloy, such as steel or aluminum. In one embodiment, liner plate 32 further includes a heater mounted in a recess 104 on rear surface 90, wherein the heater aids in curing concrete within mold 46 to reduce the occurrence of concrete sticking to front surface 44a and removable liner face 100.

Figure 3A:
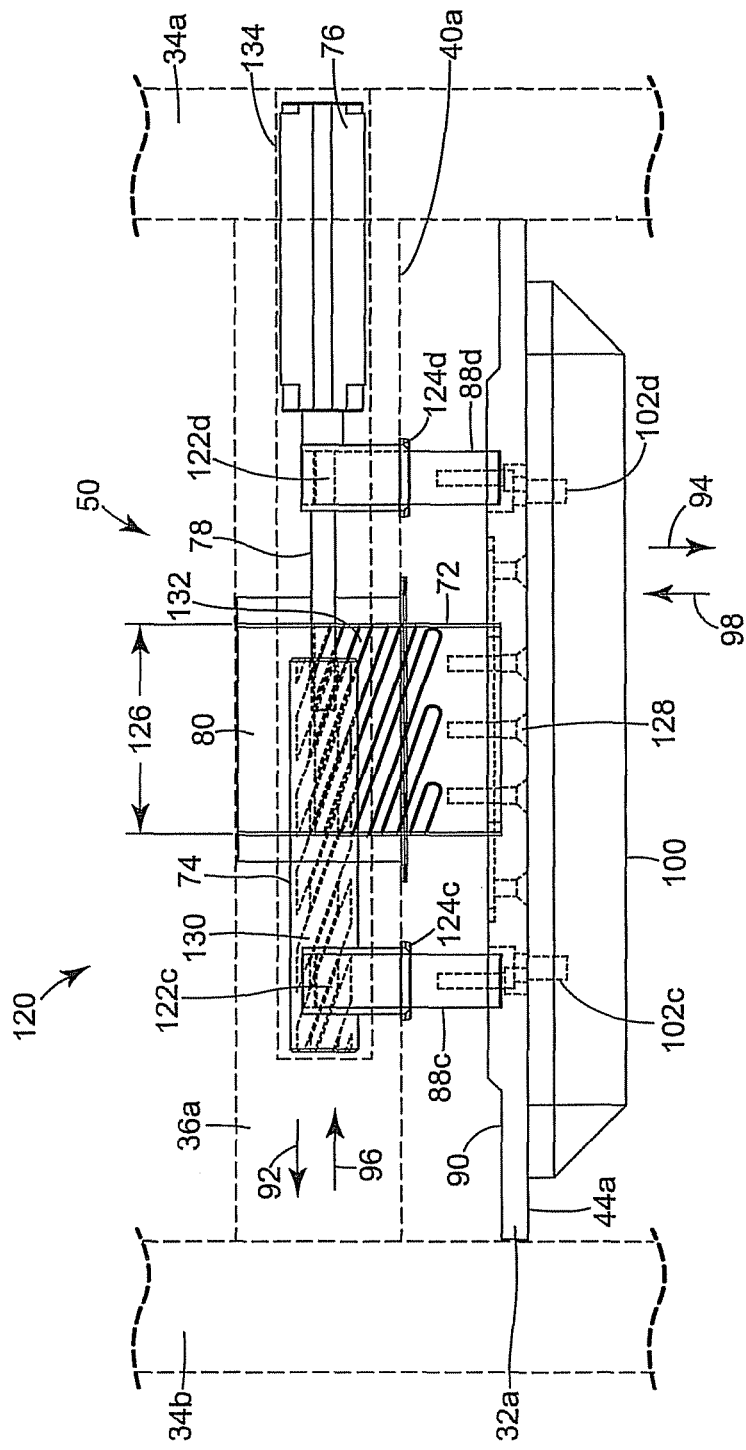
FIG. 3A is a top view of gear drive assembly and moveable liner plate as illustrated in FIG. 2.

FIG. 3A is a top view 120 of gear drive assembly 50 and liner plate 32a, as indicated by directional arrow 106 in FIG. 2. In the illustration, side members 34a and 34b, and cross member 36a are indicated dashed lines. Guide posts 88c and 88d are slidably inserted into guide holes 122c and 122d, respectively, which extend into cross member 36a from interior surface 40a. Guide holes 122a and 122b, corresponding respectively to guide posts 88a and 88b, are not shown but are located below and in-line with guide holes 122c and 122d. In one embodiment, guide hole bushings 124c and 124d are inserted into guide holes 122c and 122d, respectively, and slidably receive guide posts 88c and 88d. Guide hole bushings 124a and 124b are not shown, but are located below and in-line with guide hole bushings 124c and 124d. Gear track 80 is shown as being slidably inserted in a gear slot 126 extending through cross member 36a with gear plate 72 sliding in gear track 80. Gear plate 72 is indicated as being coupled to liner plate 32a by a plurality of fasteners 128 extending through liner plate 32a from front surface 44a.

A cylindrical gear shaft is indicated by dashed lines 134 as extending through side member 34a and into cross member 36a and intersecting, at least partially with gear slot 126. Cylindrical gear head 74, cylinder 76, and piston rod 78 are slidably inserted into gear shaft 134 with cylindrical gear head 74 being positioned over gear plate 72. The angled channels of cylindrical gear head 74 are shown as dashed lines 130 and are interlocking with the angled channels of gear plate 72 as indicated at 132.

Figure 3B:
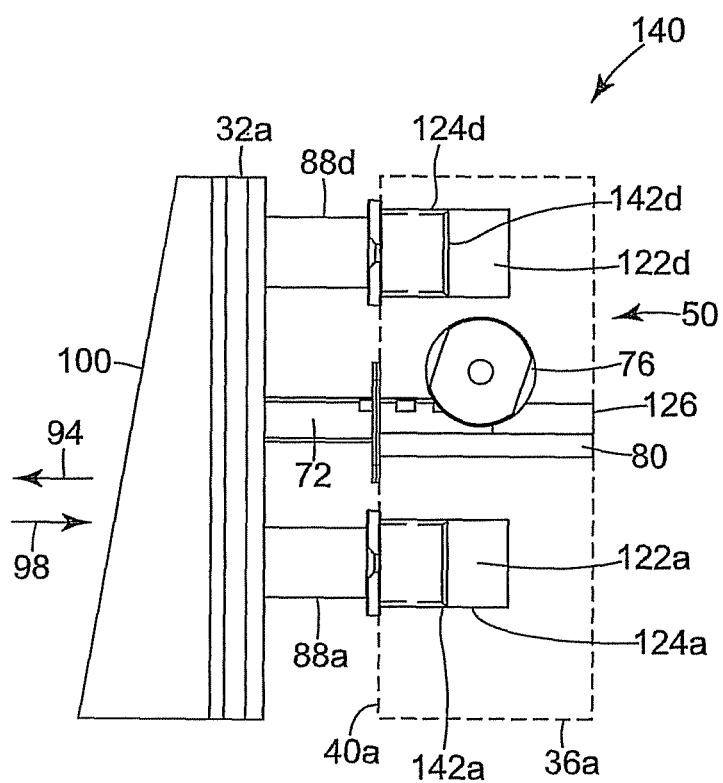
FIG. 3B is a side view of gear drive assembly and moveable liner plate as illustrated in FIG. 2.

FIG. 3B is a side view 140 of gear drive assembly 50 and liner plate 32a, as indicated by directional arrow 108 in FIG. 2. Liner plate 32a is indicated as being extended, at least partially, from cross member 36a. Correspondingly, guide posts 88a and 88d are indicated as partially extending from guide hole bushings 124a and 124d, respectively. In one embodiment, a pair of limit rings 142a and 142d are selectively coupled to guide posts 88a and 88, respectively, to limit an extension distance that liner plate 32a can be extended from cross member 36a toward the interior of mold cavity 46. Limit rings 142b and 142c corresponding respectively to guide posts 88b and 88c are not shown, but are located behind and in-line with limit rings 142a and 142d. In the illustrated embodiment, the limit rings are indicated as being substantially at an end of the guide posts, thus allowing a substantially maximum extension distance from cross member 36a. However, the limit rings can be placed at other locations along the guide posts to thereby adjust the allowable extension distance.

Figure 4B:
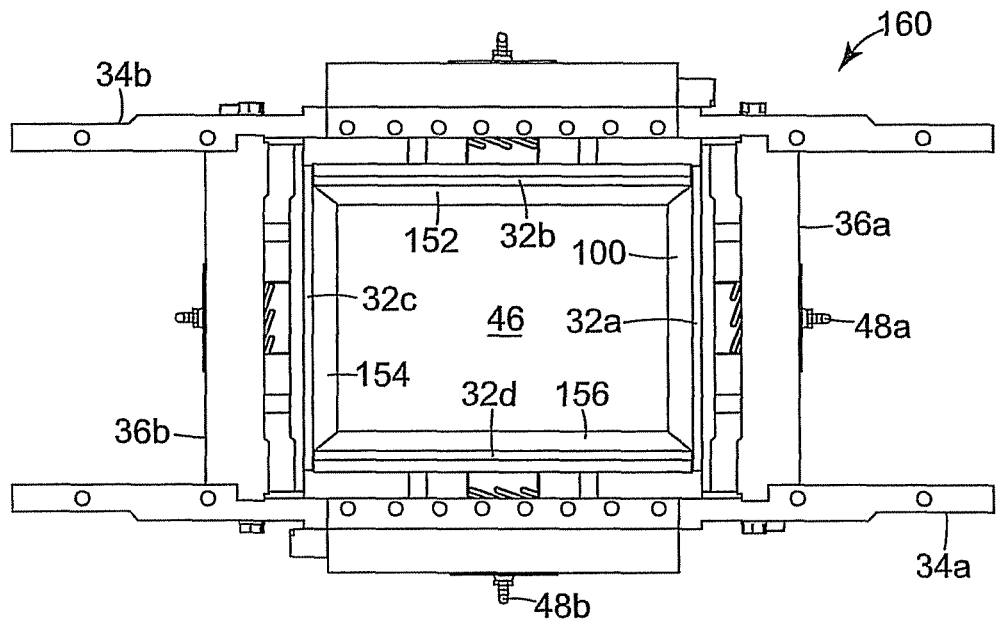
FIG. 4B is a top view of the mold assembly of FIG. 1 having the liner plates extended.
Figure 4A:
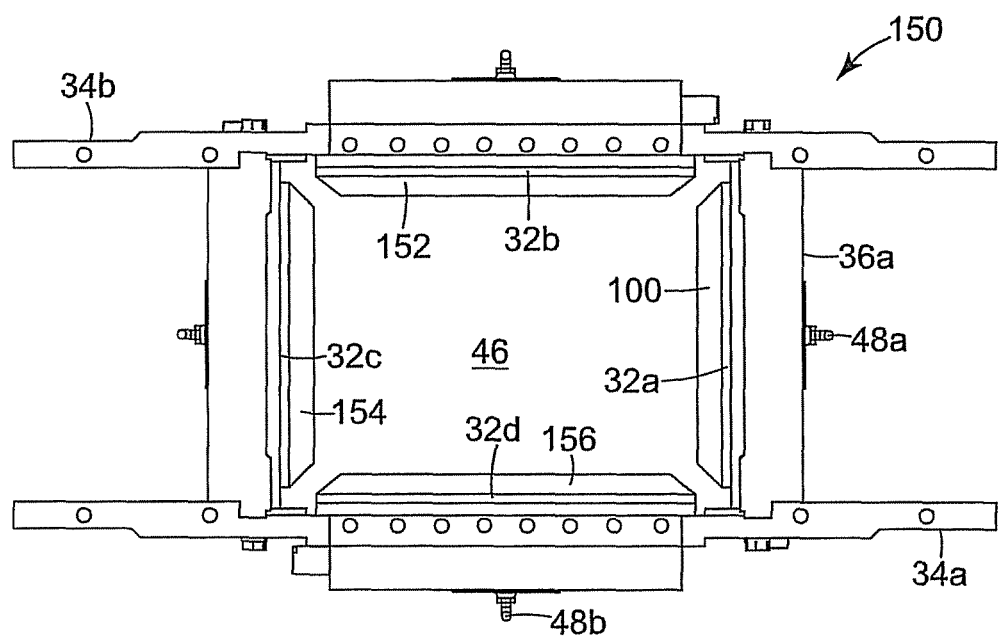
FIG. 4A is a top view of the mold assembly of FIG. 1 having the liner plates retracted.

FIG. 4A and FIG. 4B are top views 150 and 160, respectively, of mold assembly 30. FIG. 4A illustrates liner plates 32a, 32b, 32c, and 32d in retracted positions. Liner faces 152, 154, and 154 correspond respectively to liner plates 32b, 32c, and 32d. FIG. 4B illustrates liner plates 32a, 32b, 32c, and 32d, along with their corresponding liner faces 100, 152, 154, and 156 in an extended position.

FIG. 5A is a top view 170 of gear plate 72. Gear plate 72 includes a plurality of angled channels 172 running across a top surface 174 of gear plate 72. Angled channels 172 form a corresponding plurality of linear "teeth" 176 having as a surface the top surface 174. Each angled channel 172 and each tooth 176 has a respective width 178 and 180. The angled channels run at an angle (Θ) 182 from 0°, indicated at 186, across gear plate 72.

FIG. 5B is an end view ("A") 185 of gear plate 72, as indicated by directional arrow 184 in FIG. 5A, further illustrating the plurality of angled channels 172 and linear teeth 176. Each angled channel 172 has a depth 192.

FIG. 5C illustrates a view 200 of a flat surface 202 of cylindrical gear head 76. Cylindrical gear head 76 includes a plurality of angled channels 204 running across surface 202. Angled channels 204 form a corresponding plurality of linear teeth 206. The angled channels 204 and linear teeth 206 have widths 180 and 178, respectively, such that the width of linear teeth 206 substantially matches the width of angled channels 172 and the width of angled channels 204 substantially match the width of linear teeth 176. Angled channels 204 and teeth 206 run at angle (Θ) 182 from 0°, indicated at 186, across surface 202.

FIG. 5D is an end view 210 of cylindrical gear head 76, as indicated by directional arrow 208 in FIG. 5C, further illustrating the plurality of angled channels 204 and linear teeth 206. Surface 202 is a flat surface tangential to a radius of cylindrical gear head 76. Each angled channel has a depth 192 from flat surface 202.

When cylindrical gear head 76 is "turned over" and placed across surface 174 of gear plate 72, linear teeth 206 of gear head 76 mate and interlock with angled channels 172 of gear plate 72, and linear teeth 176 of gear plate 72 mate and interlock with angled channels 204 of gear head 76 (See also FIG. 2). When gear head 76 is forced in direction 92, linear teeth 206 of gear head 76 push against linear teeth 176 of gear plate 72 and force gear plate 72 to move in direction 94. Conversely, when gear head 76 is forced in direction 96, linear teeth 206 of gear head 76 push against linear teeth 176 of gear plate 72 and force gear plate 72 to move in direction 98.

In order for cylindrical gear head 76 to force gear plate 72 in directions 94 and 98, angle (Θ) 182 must be greater than 0° and less than 90°. However, it is preferable that Θ 182 be at least greater than 45°. When Θ 182 is 45° or less, it takes more force for cylindrical gear head 74 moving in direction 92 to push gear plate 72 in direction 94 than it does for gear plate 72 being forced in direction 98 to push cylindrical gear head 74 in direction 96, such as when concrete in mold 46 is being compressed. The more Θ 182 is increased above 45°, the greater the force that is required in direction 98 on gear plate 72 to move cylindrical gear head 74 in direction 96. In fact, at 90° gear plate 72 would be unable to move cylindrical gear head 74 in either direction 92 or 96, regardless of how much force was applied to gear plate 72 in direction 98. In effect, angle (Θ) acts as a multiplier to a force provided to cylindrical gear head 74 by cylinder 76 via piston rod 78. When Θ 182 is greater than 45°, an amount of force required to be applied to gear plate 72 in direction 98 in order to move cylindrical gear head 74 in direction 96 is greater than an amount of force required to be applied to cylindrical gear head 74 in direction 92 via piston rod 78 in order to "hold" gear plate 72 in position (i.e., when concrete is being compressed in mold 46).

However, the more Θ 182 is increased above 45°, the less distance gear plate 72, and thus corresponding liner plate 32a, will move in direction 94 when cylindrical gear head 74 is forced in direction 92. A preferred operational angle for Θ 182 is approximately 70°. This angle represents roughly a balance, or compromise, between the length of travel of gear plate 72 and an increase in the level of force required to be applied in direction 98 on gear plate 72 to force gear head 74 in direction 96. Gear plate 72 and cylindrical gear head 74 and their corresponding angled channels 176 and 206 reduce the required psi rating of cylinder 76 necessary to maintain the position of liner plate 32a when concrete is being compressed in mold cavity 46 and also reduces the wear experienced by cylinder 76. Additionally, from the above discussion, it is evident that one method for controlling the travel distance of liner plate 32a is to control the angle (Θ) 182 of the angled channels 176 and 206 respectively of gear plate 72 and cylindrical gear head 74.

Figure 6A:
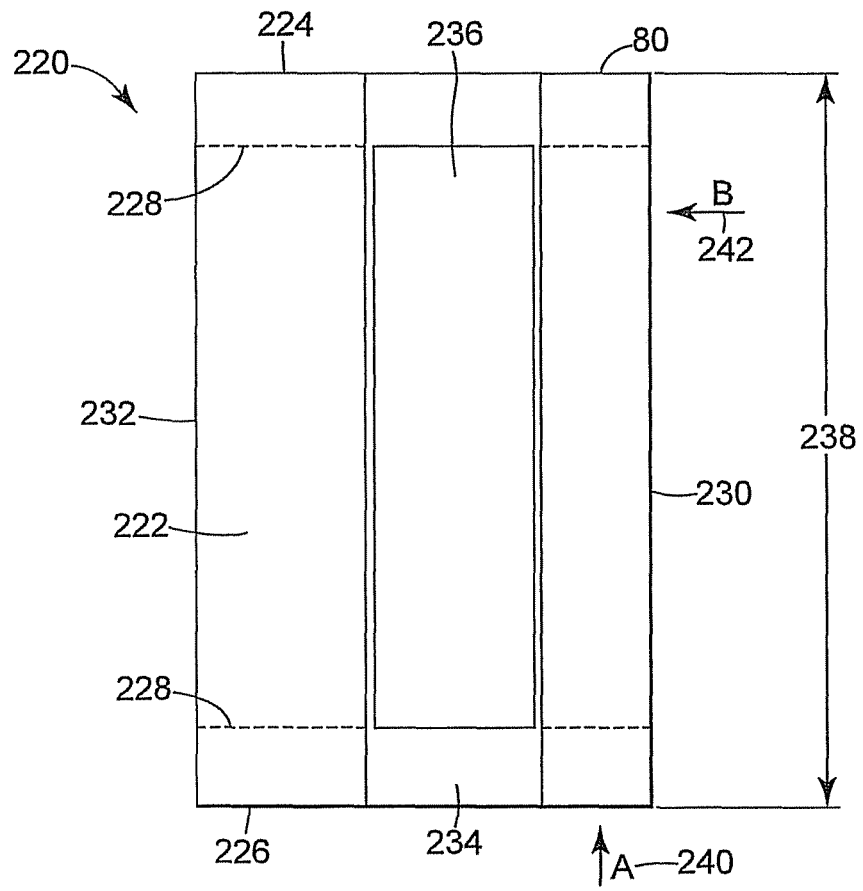
FIG. 6A is a top view of one exemplary embodiment of a gear track according to the present invention.

FIG. 6A is a top view 220 of gear track 80. Gear track 80 has a top surface 220, a first end surface 224, and a second end surface 226. A rectangular gear channel, indicated by dashed lines 228, having a first opening 230 and a second opening 232 extends through gear track 80. An arcuate channel 234, having a radius required to accommodate cylindrical gear head 76 extends across top surface 220 and forms a gear window 236 extending through top surface 222 into gear channel 228. Gear track 80 has a width 238 incrementally less than a width of gear opening 126 in side member 36a (see also FIG. 3A).

Figure 6B:
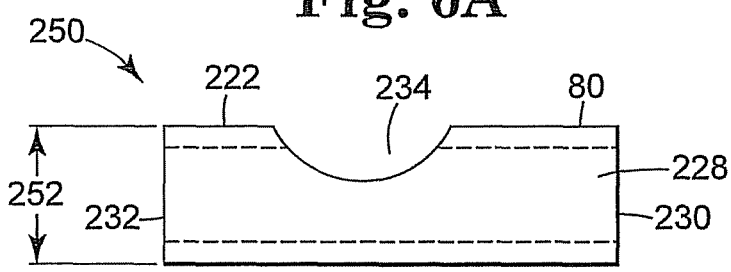
FIG. 6B is a side view of the gear track of FIG. 6A.
Figure 6C:
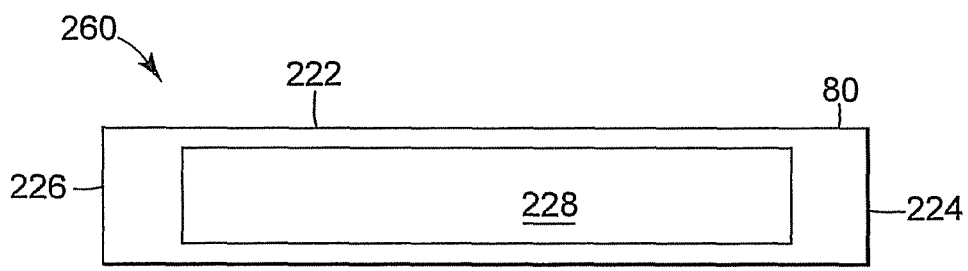
FIG. 6C is an end view of the gear track of FIG. 6A.

FIG. 6B is an end view 250 of gear track 80, as indicated by direction arrow 240 in FIG. 6A, further illustrating gear channel 228 and arcuate channel 234. Gear track 80 has a depth 252 incrementally less than height of gear opening 126 in side member 36a (see FIG. 3A). FIG. 6B is a side view 260 of gear track 80 as indicated by directional arrow 242 in FIG. 6A.

Figure 7:
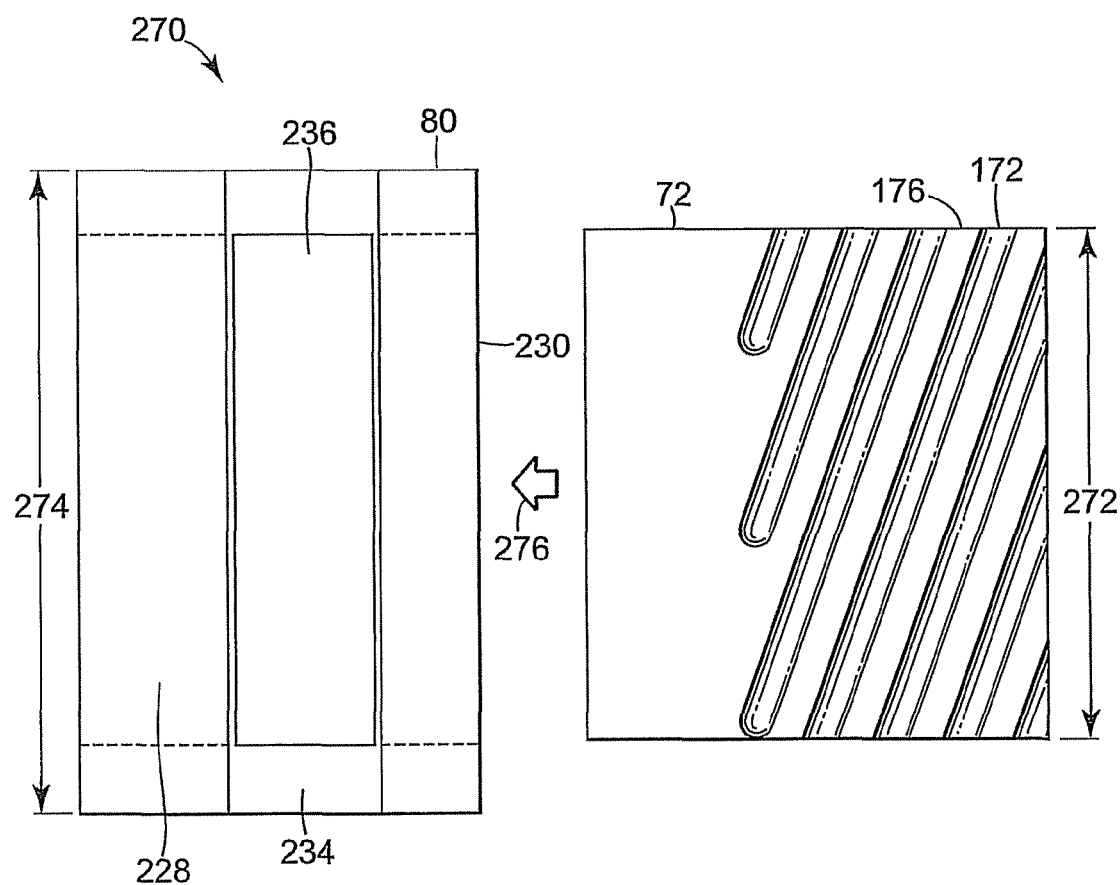
FIG. 7 is a diagram illustrating the relationship between a gear track and gear plate according to the present invention.

FIG. 7 is a top view 270 illustrating the relationship between gear track 80 and gear plate 72. Gear plate 72 has a width 272 incrementally less than a width 274 of gear track 80, such that gear plate 72 can be slidably inserted into gear channel 228 via first opening 230. When gear plate 72 is inserted within gear track 80, angled channels 172 and linear teeth 176 are exposed via gear window 236.

Figure 8A:
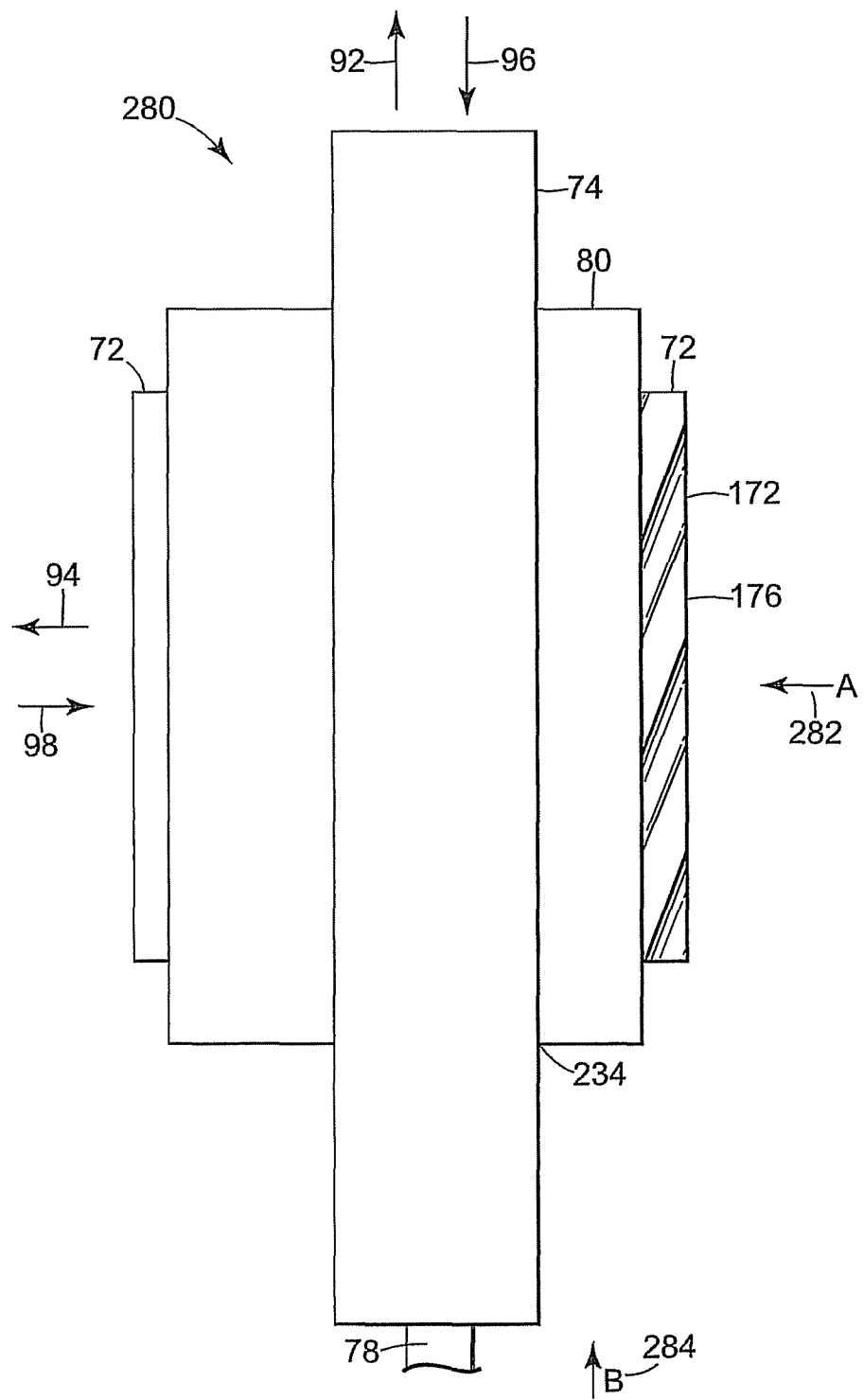
FIG. 8A is a top view illustrating the relationship between one exemplary embodiment of a gear head, gear plate, and gear track according to the present invention.

FIG. 8A is a top view 280 illustrating the relationship between gear plate 72, cylindrical gear head 74, and gear track 80. Gear plate 72 is indicated as being slidably inserted within guide track 80. Cylindrical gear head 74 is indicated as being positioned within arcuate channel 234, with the angled channels and linear teeth of cylindrical gear head 74 being slidably mated and interlocked with the angled channels 172 and linear teeth 176 of gear plate 72. When cylindrical gear head 74 is moved in direction 92 by extending piston rod 78, gear plate 72 extends outward from gear track 80 in direction 94 (See also FIG. 9B below). When cylindrical gear head 74 is moved in direction 96 by retracting piston rod 78, gear plate 72 retracts into gear track 80 in direction 98 (See also FIG. 9A below).

FIG. 8B is a side view 290 of gear plate 72, cylindrical gear head 74, and guide track 80 as indicated by directional arrow 282 in FIG. 8A. Cylindrical gear head 74 is positioned such that surface 202 is located within arcuate channel 234. Angled channels 204 and teeth 206 of cylindrical gear head 74 extend through gear window 236 and interlock with angled channels 172 and linear teeth 176 of gear plate 72 located within gear channel 228. FIG. 8C is an end view 300 as indicated by directional arrow 284 in FIG. 8A, and further illustrates the relationship between gear plate 72, cylindrical gear head 74, and guide track 80.

Figure 9A:
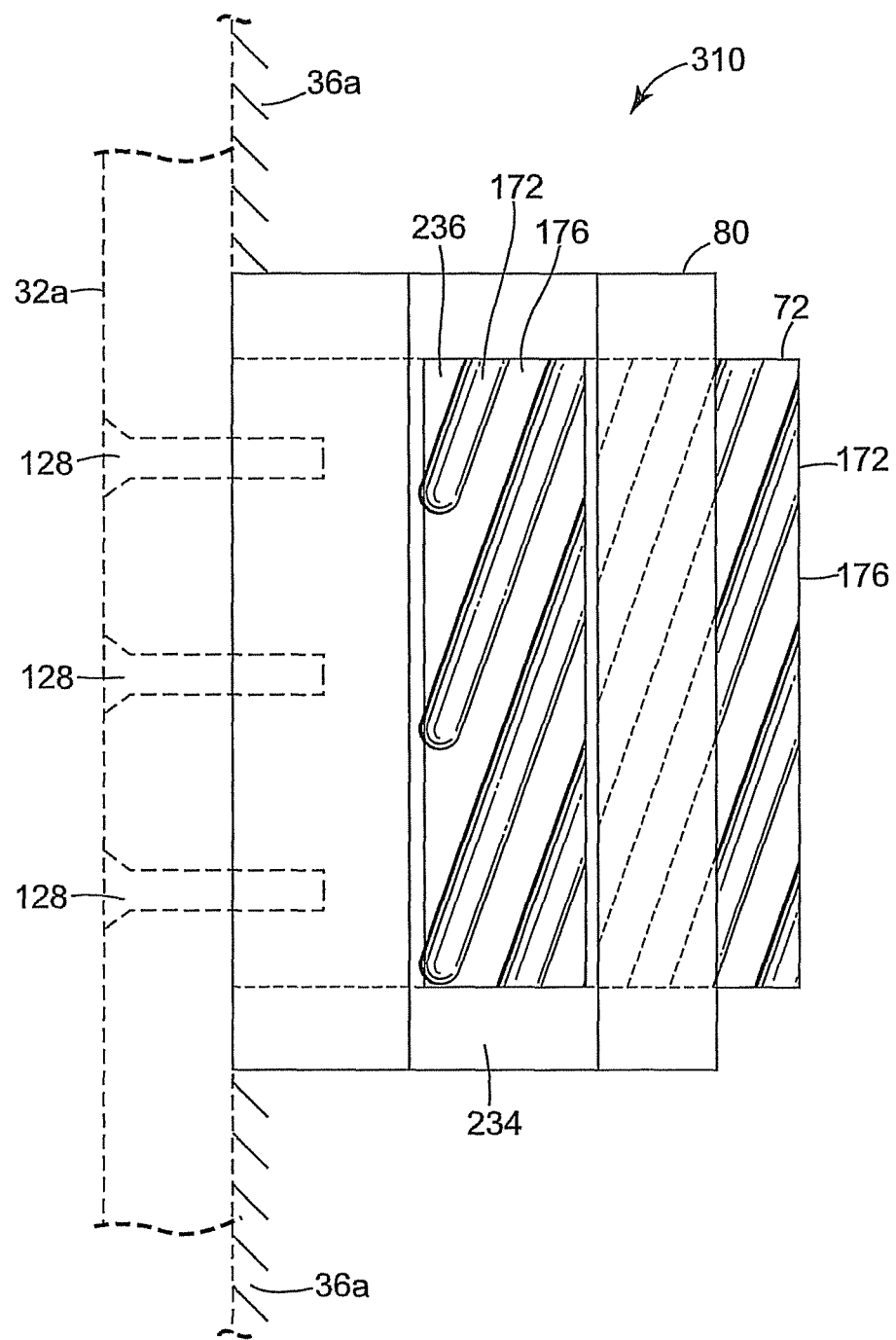
FIG. 9A is a top view illustrating one exemplary embodiment of a gear plate being in a retracted position within a gear track according to the present invention.

FIG. 9A is top view 310 illustrating gear plate 72 being in a fully retracted position within gear track 80, with liner plate 32a being retracted against cross member 36a. For purposes of clarity, cylindrical gear head 74 is not shown. Angled channels 172 and linear teeth 176 are visible through gear window 236. Liner plate 32a is indicated as being coupled to gear plate 72 with a plurality of fasteners 128 extending through liner plate 32a into gear plate 72. In one embodiment, fasteners 128 threadably couple liner plate 32a to gear plate 72.

Figure 9B:
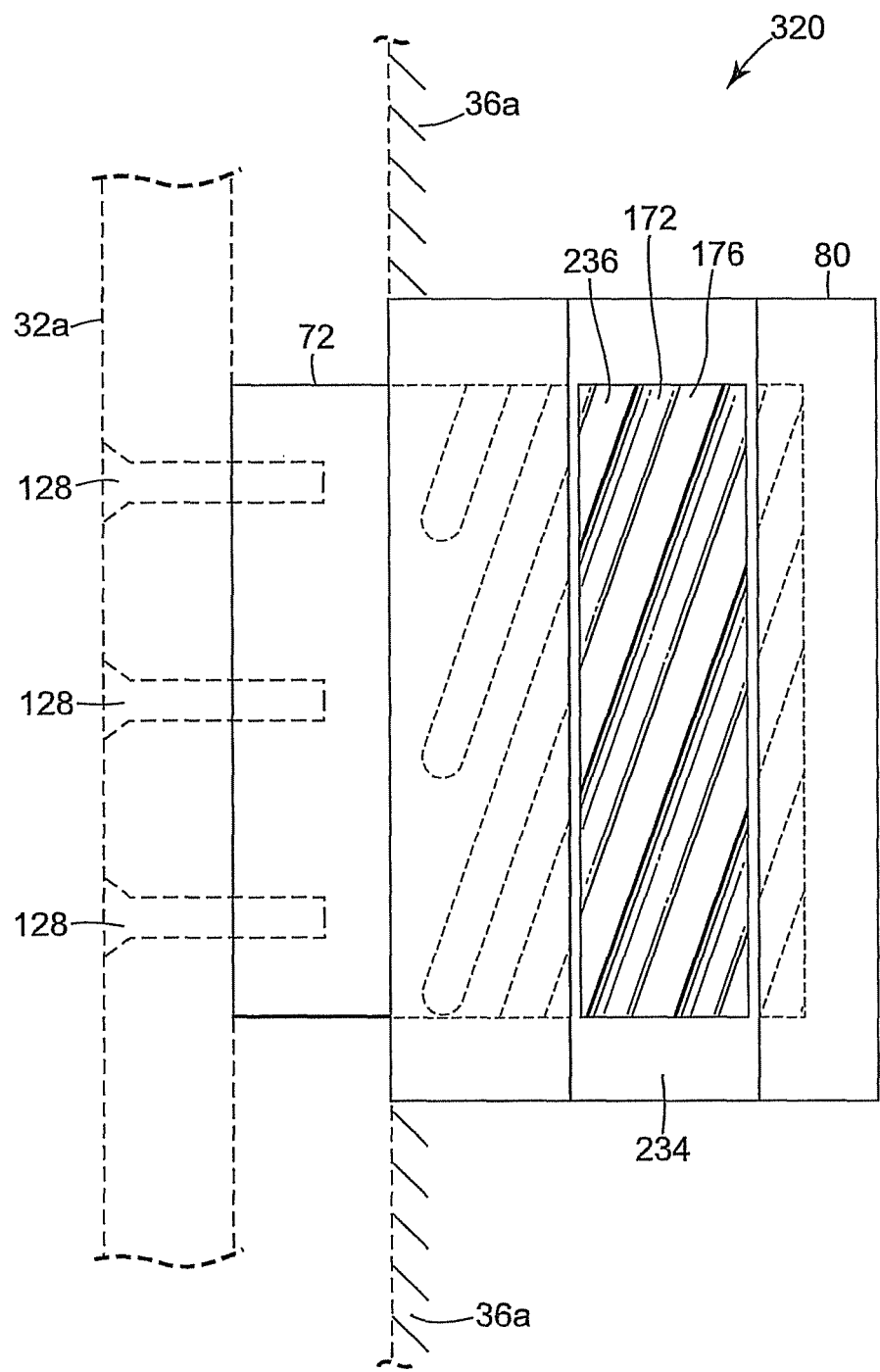
FIG. 9B is a top view illustrating one exemplary embodiment of a gear plate being in an extended position from a gear track according to the present invention.

FIG. 9B is a top view 320 illustrating gear plate 72 being extended, at least partially from gear track 80, with liner plate 32a being separated from cross member 36a. Again, cylindrical gear head 74 is not shown and angled channels 172 and linear teeth 176 are visible through gear window 236.

FIG. 10A is a diagram 330 illustrating one exemplary embodiment of a gear drive assembly 332 according to the present invention. Gear drive assembly 332 includes cylindrical gear head 74, cylinder 76, piston rod 78, and a cylindrical sleeve 334. Cylindrical gear head 74 and piston rod 78 are configured to slidably insert into cylindrical sleeve 334. Cylinder 76 is threadably coupled to cylindrical sleeve 334 with an O-ring 336 making a seal. A window 338 along an axis of cylindrical sleeve 334 partially exposes angled channels 204 and linear teeth 206. A fitting 342, such as a pneumatic or hydraulic fitting, is indicated as being threadably coupled to aperture 82. Cylinder 76 further includes an aperture 344, which is accessible through cross member 36a.

Gear drive assembly 332 is configured to slidably insert into cylindrical gear shaft 134 (indicated by dashed lines) so that window 338 intersects with gear slot 126 so that angled channels 204 and linear teeth 206 are exposed within gear slot 126. Gear track 80 and gear plate 72 (not shown) are first slidably inserted into gear slot 126, such that when gear drive assembly 332 is slidably inserted into cylindrical gear shaft 134 the angled channels 204 and linear teeth 206 of cylindrical gear head 74 slidably mate and interlock with the angled channels 172 and linear teeth 176 of gear plate 72.

In one embodiment, a key 340 is coupled to cylindrical gear head 74 and rides in a key slot 342 in cylindrical sleeve 334. Key 340 prevents cylindrical gear head 74 from rotating within cylindrical sleeve 334. Key 340 and key slot 342 together also control the maximum extension and retraction of cylindrical gear head 74 within cylindrical sleeve 334. Thus, in one embodiment, key 340 can be adjusted to control the extension distance of liner plate 32a toward the interior of mold cavity 46. FIG. 10A is a top view 350 of cylindrical shaft 334 as illustrated in FIG. 10B, and further illustrates key 340 and key slot 342.

Figure 11A:
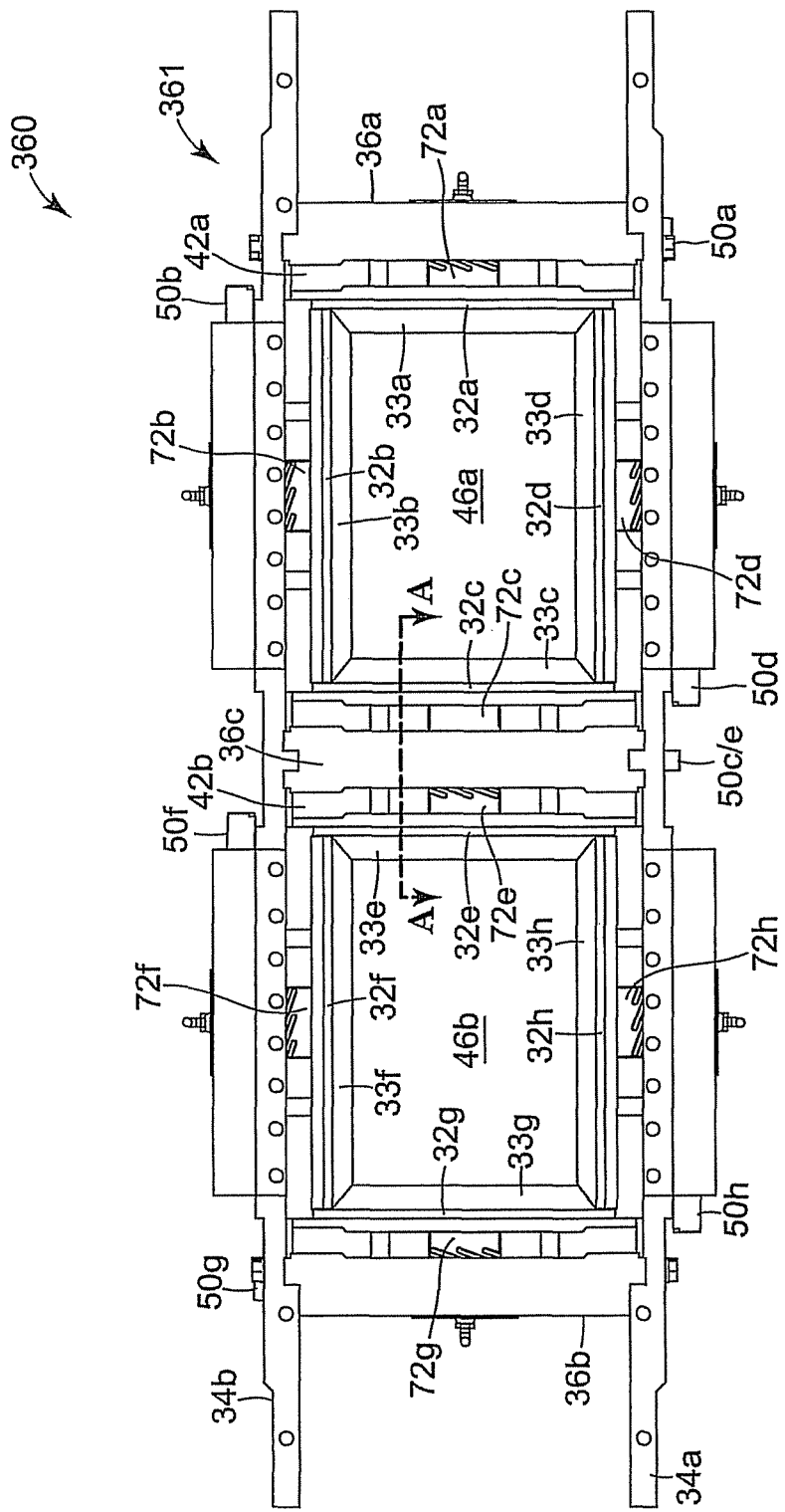
FIG. 11A is a top view illustrating one exemplary embodiment of a mold assembly according to the present invention.

FIG. 11A is a top view illustrating one exemplary embodiment of a mold assembly 360 according to the present invention for forming two concrete blocks. Mold assembly 360 includes a mold frame 361 having side members 34a and 34b and cross members 36a through 36c coupled to one another so as to form a pair of mold boxes 42a and 42b. Mold box 42a includes moveable liner plates 32a through 32d and corresponding removable liner faces 33a through 33d configured to form a mold cavity 46a. Mold box 42b includes moveable liner plates 32e through 32h and corresponding removable liner faces 33e through 33h configured to form a mold cavity 46b.

Each moveable liner plate has an associated gear drive assembly located internally to an adjacent mold frame member as indicated by 50a through 50h. Each moveable liner plate is illustrated in an extended position with a corresponding gear plate indicated by 72a through 72h. As described below, moveable liner plates 32c and 32e share gear drive assembly 50c/e, with gear plate 72e having its corresponding plurality of angled channels facing upward and gear plate 72c having its corresponding plurality of angled channels facing downward.

Figure 11B:
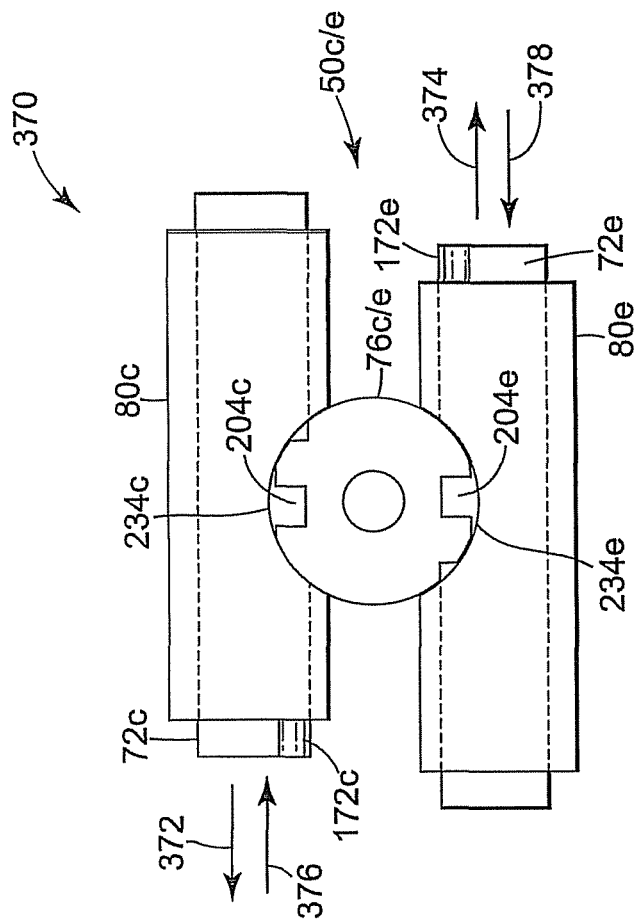
FIG. 11B is a diagram illustrating one exemplary embodiment of a gear drive assembly according to the present invention.

FIG. 11B is diagram illustrating a gear drive assembly according to the present invention, such as gear drive assembly 50c/e. FIG. 11B illustrates a view of gear drive assembly 50c/e as viewed from section A-A through cross-member 36c of FIG. 11A. Gear drive assembly 50c/e includes a single cylindrical gear head 76c/e having angled channels 204c and 204e on opposing surfaces. Cylindrical gear head 76c/e fits into arcuate channels 234c and 234e of gear tracks 80c and 80d, such that angled channels 204c and 204e slidably interlock with angled channels 172c and 172e of gear plates 72c and 72e respectively.

Angled channels 172c and 204c, and 172e and 204e oppose one another and are configured such that when cylindrical gear head 76c/e is extended (e.g. out from FIG. 11B) gear plate 72c moves in a direction 372 toward the interior of mold cavity 46a and gear plate 72e moves in a direction 374 toward the interior of mold cavity 46b. Similarly, when cylindrical gear head 76c/e is retracted (e.g. into FIG. 11B) gear plate 72c moves in a direction 376 away from the interior of mold cavity 46a and gear plate 72e moves in a direction 378 away from the interior of mold cavity 378. Again, cylindrical gear head 76c/e and gear plates 72c and 72c could be of any suitable shape.

Figure 12:
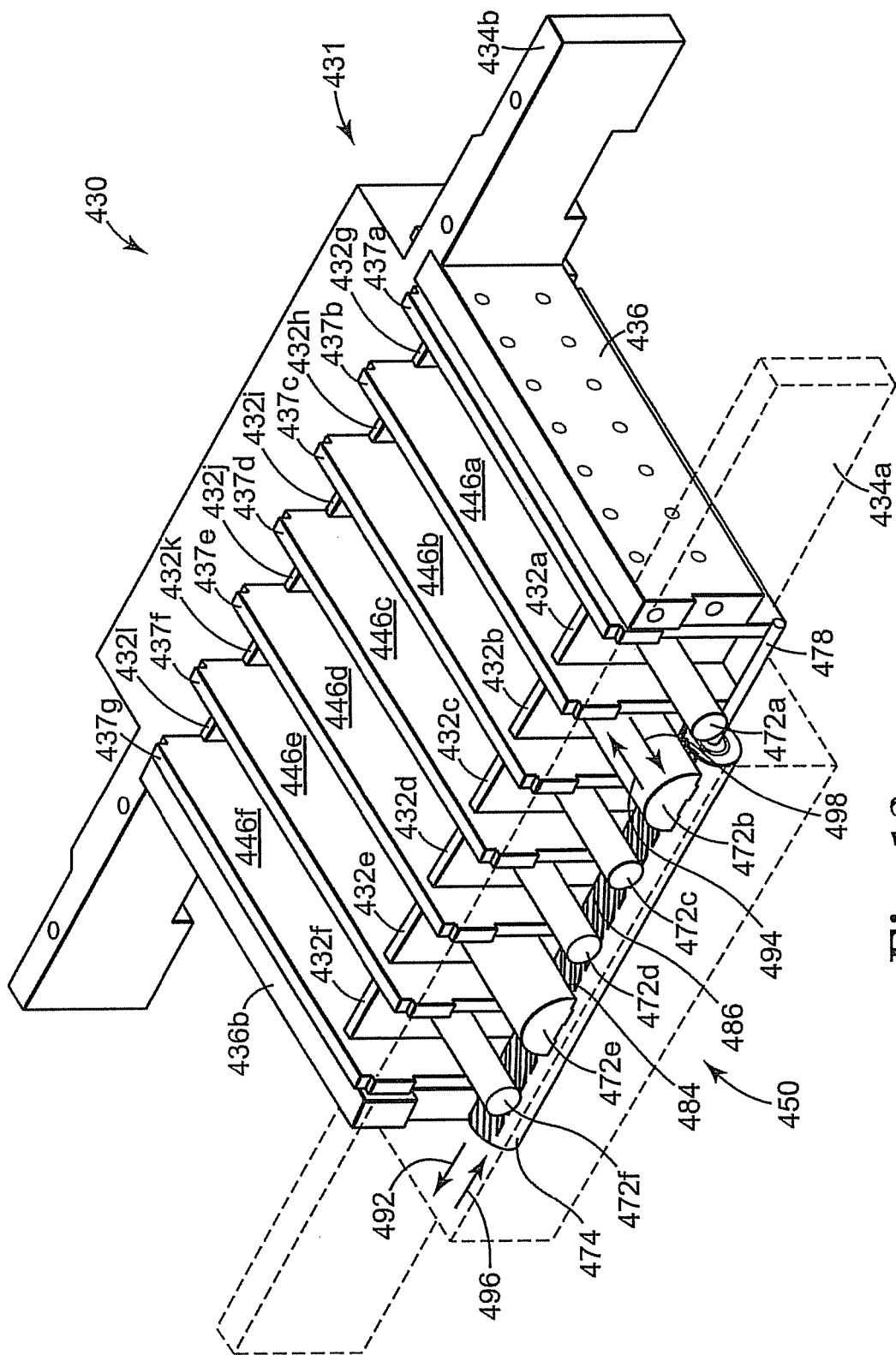
FIG. 12 is a perspective view illustrating a portion of one exemplary embodiment of a mold assembly according to the present invention.

FIG. 12 is a perspective view illustrating a portion of one exemplary embodiment of a mold assembly 430 according to the present invention. Mold assembly includes moveable liner plates 432a through 432l for simultaneously molding multiple concrete blocks. Mold assembly 430 includes a drive system assembly 431 having a side members 434a and 434b, and cross members 436a and 436b. For illustrative purposes, side member 434a is indicated by dashed lines. Mold assembly 430 further includes division plates 437a through 437g.

Together, moveable liner plates 432a through 432l and division plates 437a through 437g form mold cavities 446a through 446f, with each mold cavity configured to form a concrete block. Thus, in the illustrated embodiment, mold assembly 430 is configured to simultaneously form six blocks. However, it should be apparent from the illustration that mold assembly 430 can be easily modified for simultaneously forming quantities of concrete blocks other than six.

In the illustrated embodiment, side members 434a and 434b each have a corresponding gear drive assembly for moving moveable liner plates 432a through 432f and 432g through 432l, respectively. For illustrative purposes, only gear drive assembly 450 associated with side member 434a and corresponding moveable liner plates 432a through 432g is shown. Gear drive assembly 450 includes first gear elements 472a through 472f selectively coupled to corresponding moveable liner plates 432a through 432f, respectively, and a second gear element 474. In the illustrated embodiment, first gear elements 472a through 472f and second gear element 474 are shown as being cylindrical in shape. However, any suitable shape can be employed.

Second gear element 474 is selectively coupled to a cylinder-piston (not shown) via a piston rod 478. In one embodiment, which is described in greater detail below (see FIG. 12), second gear element 474 is integral with the cylinder-piston so as to form a single component.

In the illustrated embodiment, each first gear element 472a through 472b further includes a plurality of substantially parallel angled channels 484 that slidably mesh and interlock with a plurality of substantially parallel angled channels 486 on second gear element 474. When second gear element 474 is moved in a direction indicated by arrow 492, each of the moveable liner plates 432a through 432f moves in a direction indicated by arrow 494. Similarly, when second gear element 474 is move in a direction indicated by arrow 496, each of the moveable liner plates 432a through 432f moves in a direction indicated by arrow 498.

In the illustrated embodiment, the angled channels 484 on each of the first gear elements 432a through 432f and the angled channels 486 are at a same angle. Thus, when second gear element 474 moves in direction 492 and 496, each moveable liner plate 432a through 432f moves a same distance in direction 494 and 498, respectively. In one embodiment, second gear element 474 includes a plurality of groups of substantially parallel angled channels with each group corresponding to a different one of the first gear elements 472a through 472f. In one embodiment, the angled channels of each group and its corresponding first gear element have a different angle such that each moveable liner plate 432a through 432f move a different distance in directions 494 and 498 in response to second gear element 474 being moved in direction 492 and 496, respectively.

Figure 13:
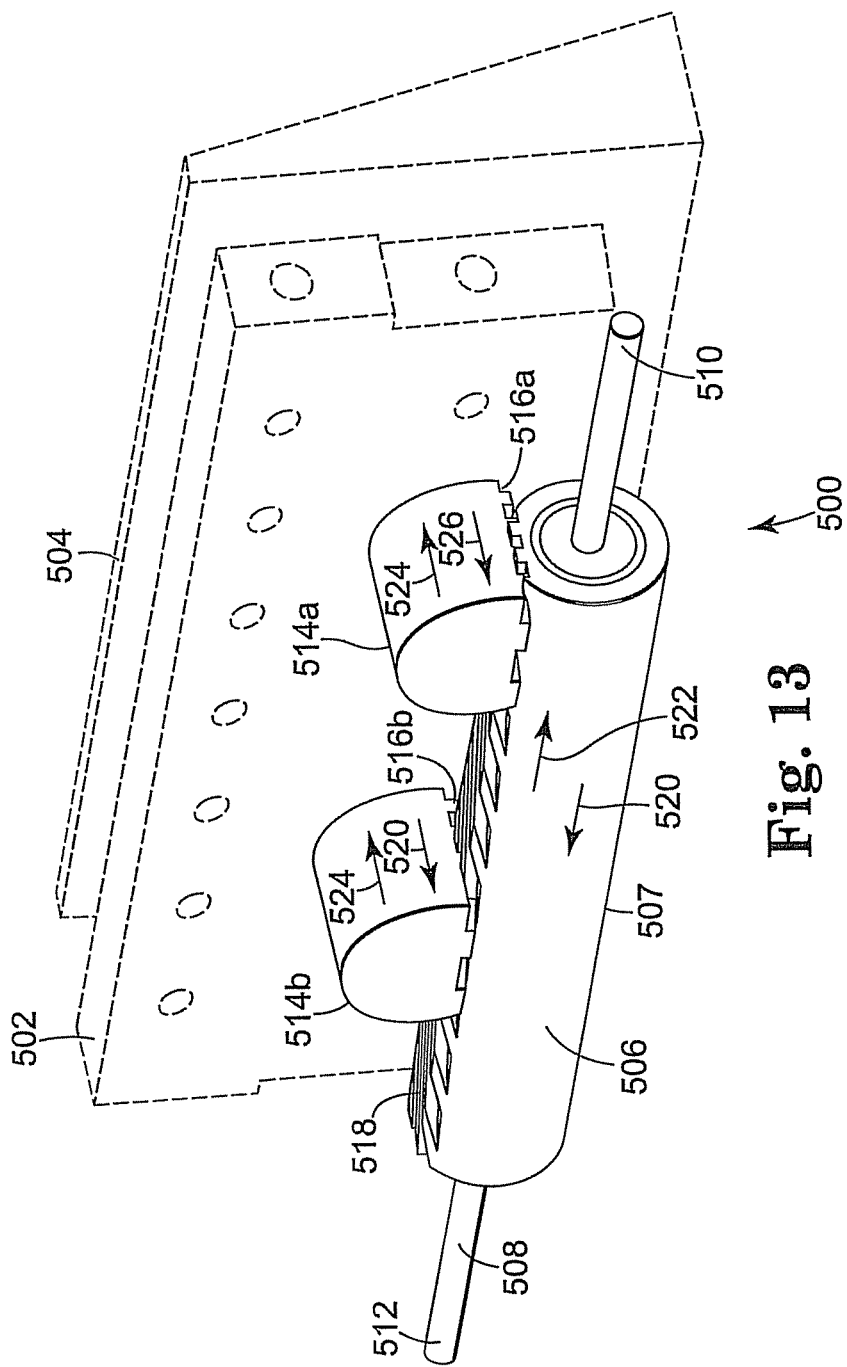
FIG. 13 is a perspective view illustrating one exemplary embodiment of a gear drive assembly according to the present invention.

FIG. 13 is a perspective view illustrating a gear drive assembly 500 according to the present invention, and a corresponding moveable liner plate 502 and removable liner face 504. For illustrative purposes, a frame assembly including side members and cross members is not shown. Gear drive assembly 500 includes double rod-end, dual-acting pneumatic cylinder-piston 506 having a cylinder body 507, and a hollow piston rod 508 with a first rod-end 510 and a second rod-end 512. Gear drive assembly 500 further includes a pair of first gear elements 514a and 514b selectively coupled to moveable liner plate 502, with each first gear element 514a and 514b having a plurality of substantially parallel angled channels 516a and 516b.

In the illustrated embodiment, cylinder body 507 of cylinder-piston 506 includes a plurality of substantially parallel angled channels 518 configured to mesh and slidably interlock with angled channels 516a and 516b. In one embodiment, cylinder body 507 is configured to slidably insert into and couple to a cylinder sleeve having angled channels 518.

In one embodiment, cylinder-piston 506 and piston rod 508 are located within a drive shaft of a frame member, such as drive shaft 134 of cross-member 36a, with rod-end 510 coupled to and extending through a frame member, such as side member 34b, and second rod-end 512 coupled to and extending through a frame member, such a side member 34a. First rod-end 510 and second rod-end 512 are configured to receive and provide compressed air to drive dual-acting cylinder-piston 506. With piston rod 508 being fixed to side members 34a and 34b via first and second rod-ends 512 and 510, cylinder-piston 506 travels along the axis of piston rod 508 in the directions as indicated by arrows 520 and 522 in response to compressed air received via first and second rod-ends 510 and 512.

When compressed air is received via second rod-end 512 and expelled via first rod-end 510, cylinder-piston 506 moves within a drive shaft, such as drive shaft 134, in direction 522 and causes first gear elements 514a and 516b and corresponding liner plate 502 and liner face 504 to move in a direction indicated by arrow 524. Conversely, when compressed air is received via first rod-end 510 and expelled via second rod-end 512, cylinder-piston 506 moves within a gear shaft, such as gear shaft 134, in direction 520 and causes first gear elements 514a and 516b and corresponding liner plate 502 and liner face 504 to move in a direction indicated by arrow 526.

In the illustrated embodiment, cylinder-piston 506 and first gear elements 514a and 514b are shown as being substantially cylindrical in shape. However, any suitable shape can be employed. Furthermore, in the illustrated embodiment, cylinder-piston 506 is a double rod-end dual-acting cylinder. In one embodiment, cylinder piston 506 is a single rod-end dual acting cylinder having only a single rod-end 510 coupled to a frame member, such as side member 34b. In such an embodiment, compressed air is provided to cylinder-piston via single rod-end 510 and a flexible pneumatic connection made to cylinder-piston 506 through side member 34a via gear shaft 134. Additionally, cylinder-piston 506 comprises a hydraulic cylinder.

Figure 14:
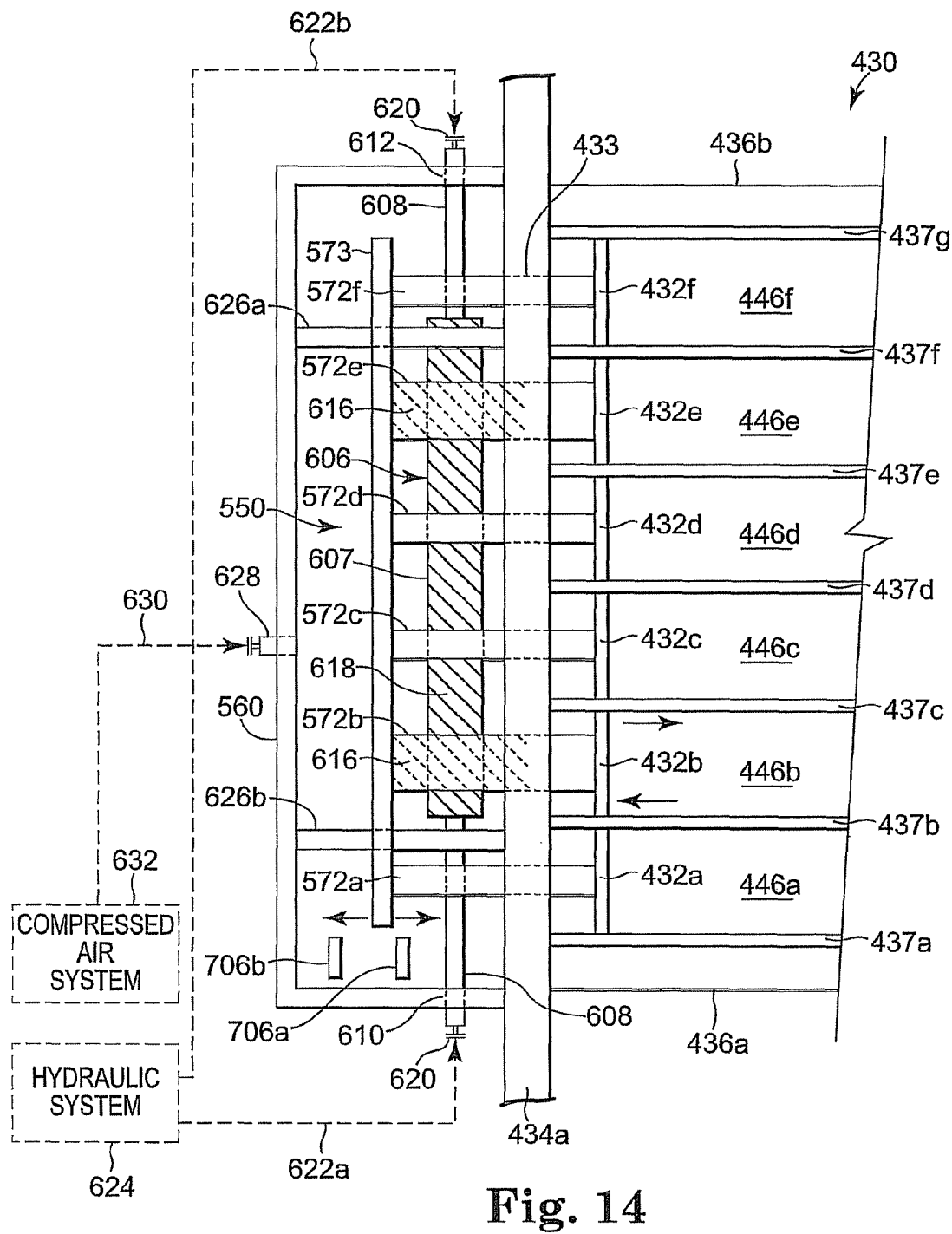
FIG. 14 is a top view illustrating a portion of one exemplary embodiment of a mold assembly and gear drive assembly according to the present invention.

FIG. 14 is a top view of a portion of mold assembly 430 (as illustrated by FIG. 12) having a drive assembly 550 according to one embodiment of the present invention. Drive assembly 550 includes first drive elements 572a to 572f that are selectively coupled to corresponding liner plates 432a to 432f via openings, such as opening 433, in side member 434a. Each of the first drive elements 572a to 572 if further coupled to a master bar 573. Drive assembly 550 further includes a double-rod-end hydraulic piston assembly 606 having a dual-acting cylinder 607 and a hollow piston rod 608 having a first rod-end 610 and a second rod-end 612. First and second rod-ends 610, 612 are stationary and are coupled to and extend through a removable housing 560 that is coupled to side member 434a and encloses drive assembly 550. First and second rod ends 610, 612 are each coupled to hydraulic fittings 620 that are configured to connect via lines 622a and 622b to an external hydraulic system 624 and to transfer hydraulic fluid to and from dual-acting cylinder 607 via hollow piston rod 608.

In one embodiment, as illustrated, first drive elements 572b and 572e include a plurality of substantially parallel angled channels 616 that slideably interlock with a plurality of substantially parallel angled channels 618 that form a second drive element. In one embodiment, as illustrated above by FIG. 12, angled channels 618 are formed on dual-acting cylinder 607 of hydraulic piston assembly 606, such that dual-acting cylinder 607 forms the second drive element. In other embodiments, as will be described by FIGS. 15A-15C below, the second drive element is separate from and operatively coupled to dual-acting cylinder 607.

When hydraulic fluid is transmitted into dual-acting cylinder 607 from second rod-end 612 via fitting 620 and hollow piston rod 608, hydraulic fluid is expelled from first rod-end 610, causing dual-acting cylinder 607 and angled channels 618 to move along piston rod 608 toward second rod-end 612. As dual-acting cylinder 607 moves toward second rod-end 612, angled channels 618 interact with angled channels 616 and drive first drive elements 572b and 572e, and thus corresponding liner plates 432b and 432e, toward the interior of mold cavities 446b and 446e, respectively. Furthermore, since each of the first drive elements 572a through 572f is coupled to master bar 573, driving first gear elements 572b and 572e toward the interiors of mold cavities 446b and 446e also moves first drive elements 572a, 572c, 572d, and 572f and corresponding liner plates 432a, 432c, 432d, and 432e toward the interiors of mold cavities 446a, 446c, 446d, and 446f, respectively. Conversely, transmitting hydraulic fluid into dual-acting cylinder 607 from first rod-end 610 via fitting 620 and hollow-piston rod 608 causes dual-acting cylinder 607 to move toward first rod-end 610, and causes liner plates 432 to move away from the interiors of corresponding mold cavities 446.

In one embodiment, drive assembly 550 further includes support shafts 626, such as support shafts 626a and 626b, which are coupled between removable housing 560 and side member 434a and extend through master bar 573. As dual-acting cylinder 607 is moved by transmitting/expelling hydraulic fluid from first and second rod-ends 610, 612, master bar 573 moves back and forth along support shafts 626. Because they are coupled to static elements of mold assembly 430, support shafts 626a and 626b provide support and rigidity to liner plates 432, drive elements 572, and master bar 573 as they move toward and away from mold cavities 446.

In one embodiment, drive assembly 550 further includes a pneumatic fitting 628 configured to connect via line 630 to and external compressed air system 632 and provide compressed air to housing 560. By receiving compressed air via pneumatic fitting 628 to removable housing 560, the internal air pressure of housing 560 is positive relative to the outside air pressure, such that air is continuously "forced" out of housing 560 through any non-sealed openings, such as openings 433 through which first drive elements 572 extend through side member 434a. By maintaining a positive air pressure and forcing air out through such non-sealed openings, the occurrence of dust and debris and other unwanted contaminants from entering housing 560 and fouling drive assembly 550 is reduced.

First and second rod ends 610, 612 are each coupled to hydraulic fittings 620 that are configured to connect via lines 622a and 622b to an external hydraulic system 624 and to transfer hydraulic fluid to and from dual-acting cylinder 607 via hollow piston rod 608.

Figure 15A:
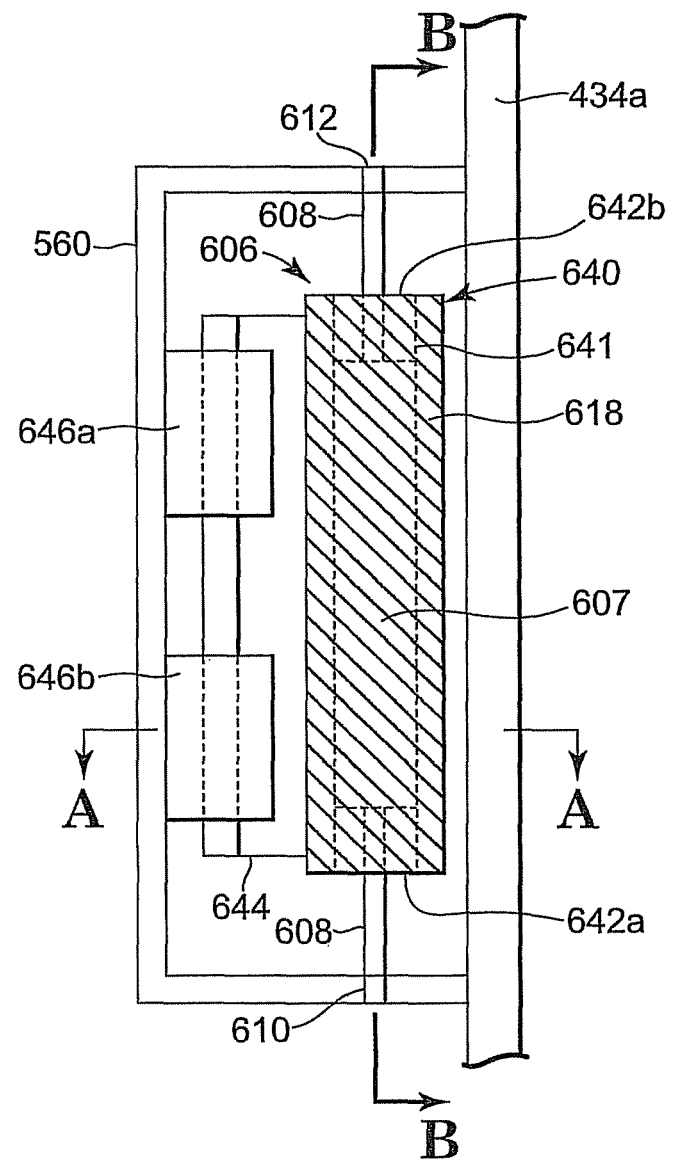
FIG. 15A is a top view illustrating a portion of one exemplary embodiment of a gear drive assembly employing a stabilizer assembly.

FIG. 15A is a top view illustrating a portion of one embodiment of drive assembly 550 according to the present invention. Drive assembly 550 includes double-rod-end hydraulic piston assembly 606 comprising dual-acting cylinder 607 and a hollow piston rod 608 with first and second rod-ends 610 and 612 being and coupled to and extending through removable housing 560.

As illustrated, dual-acting cylinder 607 is slideably-fitted inside a machined opening 641 within a second gear element 640, with hollow piston rod 608 extending through removable end caps 642. In one embodiment, end caps 646 are threadably inserted into machined opening 641 such that end caps 646 butt against and secure dual-acting cylinder 607 so that dual-acting cylinder 607 is held stationary with respect to second drive element 640. Second drive element 640 includes the plurality of substantially parallel angled channels 618, in lieu of angled channels being an integral part of dual-acting cylinder 607. With reference to FIG. 14, angled channels 618 of second gear element 640 are configured to slideably interlock with angled channels 616 of first gear elements 572b and 572e.

Second gear element 640 further includes a guide rail 644 that is slideably coupled to linear bearing blocks 646 that are mounted to housing 560. As described above with respect to FIG. 14, transmitting and expelling hydraulic fluid to and from dual-acting cylinder 607 via first and second rod-ends 610, 612 causes dual-acting cylinder 607 to move along hollow piston-rod 608. Since dual-acting cylinder 607 is "locked" in place within machined shaft 641 of second gear element 640 by end caps 642, second gear element 640 moves along hollow piston-rod 608 together with dual-acting cylinder 607. As second drive element 640 moves along hollow piston-rod 608, linear bearing blocks 646 guide and secure guide rail 644, thereby guiding and securing second drive element 640 and reducing undesirable motion in second drive element 640 that is perpendicular to hollow piston rod 608.

Figure 15B:
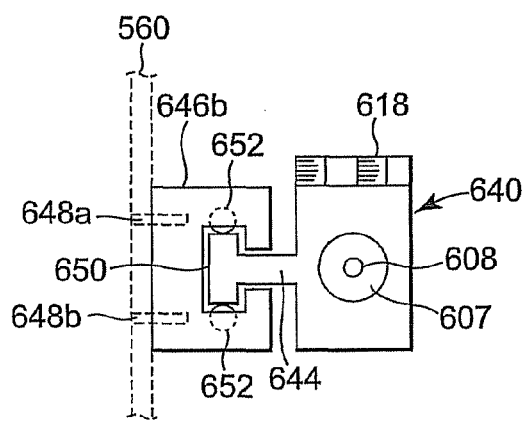
FIG. 15B is a cross-sectional view of the gear drive assembly of FIG. 15A.

FIG. 15B is a lateral cross-sectional view A-A of the portion of drive assembly 550 illustrated by FIG. 15A. Guide rail 644 is slideably fitted into a linear bearing track 650 and rides on bearings 652 as second drive element 640 is moved along piston rod 608 by dual-acting cylinder 607. In one embodiment, linear bearing block 646b is coupled to housing 560 via bolts 648.

Figure 15C:
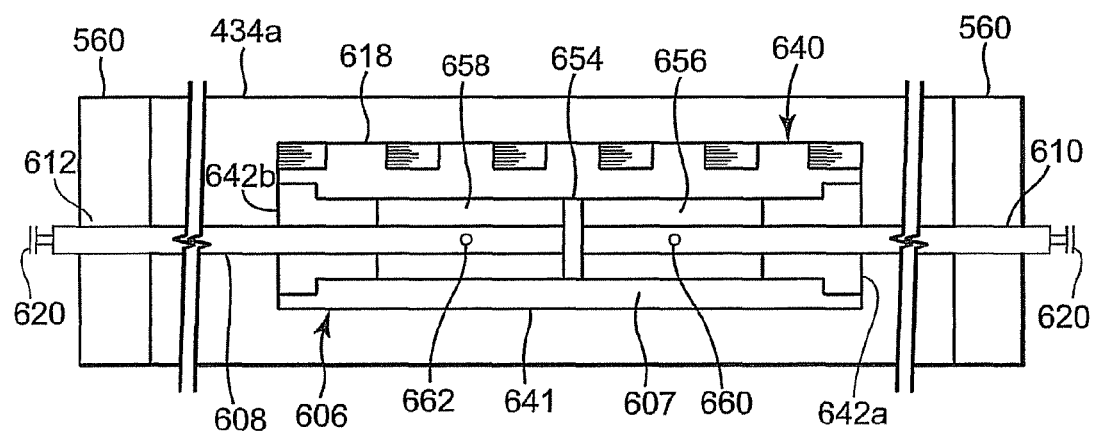
FIG. 15C is a cross-sectional view of the gear drive assembly of FIG. 15A.

FIG. 15C is a longitudinal cross-sectional view B-B of the portion of drive assembly 550 of FIG. 15A, and illustrates dual-acting cylinder 607 as being secured within shaft 641 of drive element 640 by end caps 642a and 642b. In one embodiment, end caps 642a and 642b are threadably inserted into the ends of second drive element 640 so as to butt against each end of dual-acting cylinder 607. Hollow piston rod 608 extends through end caps 642a and 642b and has first and second rod ends 610 and 612 coupled to and extending through housing 560. A divider 654 is coupled to piston rod 608 and divides dual-acting cylinder 607 into a first chamber 656 and a second chamber 658. A first port 660 and a second port 662 allow hydraulic fluid to be pumped into and expelled from first chamber 656 and second chamber 658 via first and second rod ends 610 and 612 and associated hydraulic fittings 620, respectively.

When hydraulic fluid is pumped into first chamber 656 via first rod-end 610 and first port 660, dual-acting cylinder 607 moves along hollow piston rod 608 toward first rod-end 610 and hydraulic fluid is expelled from second chamber 658 via second port 662 and second rod-end 612. Since dual-acting cylinder 607 is secured within shaft 641 by end caps 642*a* and 642*b*, second drive element 640 and, thus, angled channels 618 move toward first rod-end 610. Similarly, when hydraulic fluid is pumped into second chamber 658 via second rod-end 612 and second port 662, dual-acting cylinder 607 moves along hollow piston rod 608 toward second rod-end 612 and hydraulic fluid is expelled from first chamber 656 via first port 660 and first rod-end 610.

Figure 16:
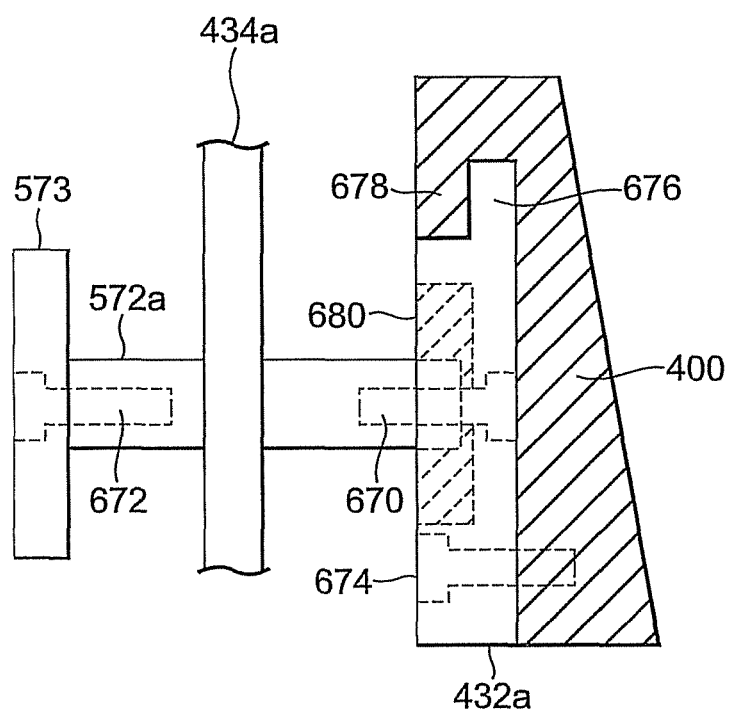
FIG. 16 is a side view illustrating a portion of one exemplary embodiment of a gear drive assembly and moveable liner plate according to the present invention.

FIG. 16 is a side view of a portion of drive assembly 550 as shown by FIG. 14 and illustrates a typical liner plate, such as liner plate 432*a*, and corresponding removable liner face 400. Liner plate 432*a* is coupled to second drive element 572*a* via a bolted connection 670 and, in-turn, drive element 572*a* is coupled to master bar 573 via a bolted connection 672. A lower portion of liner face 400 is coupled to liner plate 432*a* via a bolted connection 674. In one embodiment, as illustrated, liner plate 432*a* includes a raised "rib" 676 that runs the length of and along an upper edge of liner plate 432*a*. A channel 678 in liner face 400 overlaps and interlocks with raised rib 676 to form a "boltless" connection between liner plate 432*a* and an upper portion of liner face 400. Such an interlocking connection securely couples the upper portion of liner face 400 to liner plate 432 in an area of liner face 400 that would otherwise be too narrow to allow use of a bolted connection between liner face 400 and liner plate 432*a* without the bolt being visible on the surface of liner face 400 that faces mold cavity 446*a*.

In one embodiment, liner plate 432 includes a heater 680 configured to maintain the temperature of corresponding liner face 400 at a desired temperature to prevent concrete in corresponding mold cavity 446 sticking to a surface of liner face 400 during a concrete curing process. In one embodiment, heater 680 comprises an electric heater.

Figure 17:
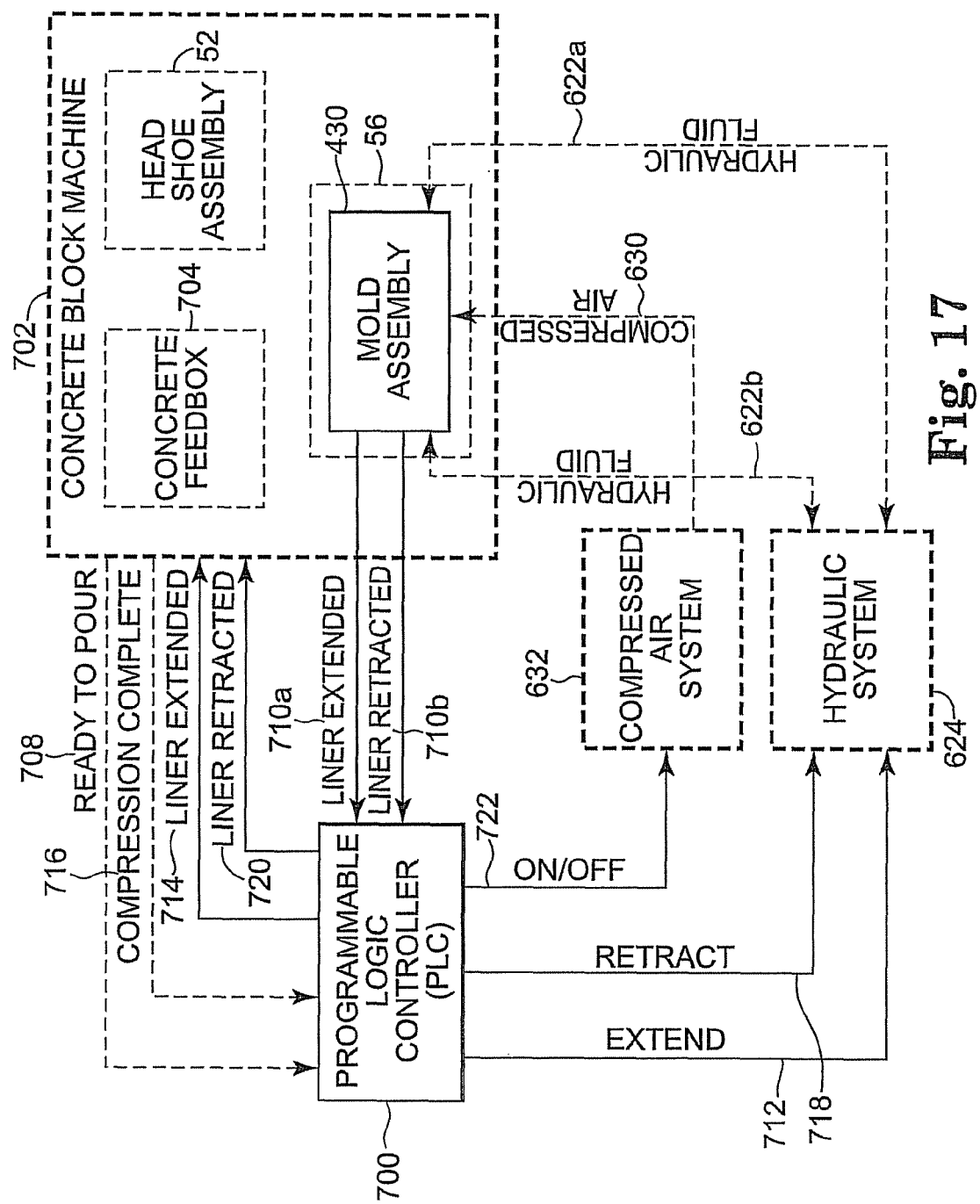
FIG. 17 is a block diagram illustrating one exemplary embodiment of a mold assembly employing a control system according to the present invention.

FIG. 17 is a block diagram illustrating one embodiment of a mold assembly according to the present invention, such as mold assembly 430 of FIG. 14, further including a controller 700 configured to coordinate the movement of moveable liner plates, such as liner plates 432, with operations of concrete block machine 702 by controlling the operation of the drive assembly, such as drive assembly 550. In one embodiment, as illustrated, controller 700 comprises a programmable logic controller (PLC).

As described above with respect to FIG. 1, mold assembly 430 is selectively coupled, generally via a plurality of bolted connections, to concrete block machine 702. In operation, concrete block machine 702 first places pallet 56 below mold box assembly 430. A concrete feedbox 704 then fills mold cavities, such as mold cavities 446, of assembly 430 with concrete. Head shoe assembly 52 is then lowered onto mold assembly 430 and hydraulically or mechanically compresses the concrete in mold cavities 446 and, together with a vibrating table on which pallet 56 is positioned, simultaneously vibrates mold assembly 430. After the compression and vibration is complete, head shoe assembly 52 and pallet 56 are lowered relative to mold cavities 446 so that the formed concrete blocks are expelled from mold cavities 446 onto pallet 56. Head shoe assembly 52 is then raised and a new pallet 56 is moved into position below mold cavities 446. The above process is continuously repeated, with each such repetition commonly referred to as a cycle. With specific reference to mold assembly 430, each such cycle produces six concrete blocks.

PLC 700 is configured to coordinate the extension and retraction of liner plates 432 into and out of mold cavities 446 with the operations of concrete block machine 702 as described above. At the start of a cycle, liner plates 432 are fully retracted from mold cavities 446. In one embodiment, with reference to FIG. 14, drive assembly 550 includes a pair of sensors, such as proximity switches 706*a* and 706*b* to monitor the position of master bar 573 and, thus, the positions of corresponding moveable liner plates 432 coupled to master bar 573. As illustrated in FIG. 14, proximity switches 706*a* and 706*b* are respectively configured to detect when liner plates 432 are in an extended position and a retracted position with respect to mold cavities 446.

In one embodiment, after pallet 56 has been positioned beneath mold assembly 430, PLC 700 receives a signal 708 from concrete block machine 702 indicating that concrete feedbox 704 is ready to deliver concrete to mold cavities 446. PLC 700 checks the position of moveable liners 432 based on signals 710*a* and 710*b* received respectively from proximity switches 706*a* and 706*b*. With liner plates 432 in a retracted position, PLC 700 provides a liner extension signal 712 to hydraulic system 624.

In response to liner extension signal 712, hydraulic system 624 begins pumping hydraulic fluid via path 622*b* to second rod-end 612 of piston assembly 606 and begins receiving hydraulic fluid from first rod-end 610 via path 622*a*, thereby causing dual-acting cylinder 607 to begin moving liner plates 432 toward the interiors of mold cavities 446. When proximity switch 706*a* detects master bar 573, proximity switch 706*a* provides signal 710*a* to PLC 700 indicating that liner plates 432 have reached the desired extended position. In response to signal 710*a*, PLC 700 instructs hydraulic system 624 via signal 712 to stop pumping hydraulic fluid to piston assembly 606 and provides a signal 714 to concrete block machine 702 indicating that liner plates 432 are extended.

In response to signal 714, concrete feedbox 704 fills mold cavities 446 with concrete and head shoe assembly 52 is lowered onto mold assembly 430. After the compression and vibrating of the concrete is complete, concrete block machine 702 provides a signal 716 indicating that the formed concrete blocks are ready to be expelled from mold cavities 446. In response to signal 716, PLC 700 provides a liner retraction signal 718 to hydraulic system 624.

In response to liner retraction signal 718, hydraulic system 624 begins pumping hydraulic fluid via path 622*a* to first rod-end 610 via path 622 and begins receiving hydraulic fluid via path 622*b* from second rod-end 612, thereby causing dual-acting cylinder 607 to begin moving liner plates 432 away from the interiors of mold cavities 446. When proximity switch 706*b* detects master bar 573, proximity switch 706*b* provides signal 710*b* to PLC 700 indicating that liner plates 432 have reached a desired retracted position. In response to signal 710*b*, PLC 700 instructs hydraulic system 624 via signal 718 to stop pumping hydraulic fluid to piston assembly 606 and provides a signal 720 to concrete block machine 702 indicating that liner plates 432 are retracted.

In response to signal 720, head shoe assembly 52 and pallet 56 eject the formed concrete blocks from mold cavities 446. Concrete block machine 702 then retracts head shoe assembly 52 and positions a new pallet 56 below mold assembly 430. The above process is then repeated for the next cycle.

In one embodiment, PLC 700 is further configured to control the supply of compressed air to mold assembly 430. In one embodiment, PLC 700 provides a status signal 722 to compressed air system 630 indicative of when concrete block machine 702 and mold assembly 430 are in operation and forming concrete blocks. When in operation, compressed air system 632 provides compressed air via line 630 and pneumatic fitting 628 to housing 560 of mold assembly 420 to reduce the potential for dirt/dust and other debris from entering drive assembly 550. When not in operation, compressed air system 632 does not provide compressed air to mold assembly 430.

Although the above description of controller 700 is in regard to controlling a drive assembly employing only a single piston assembly, such as piston assembly 606 of drive assembly 500, controller 700 can be adapted to control drive assemblies employing multiple piston assemblies and employing multiple pairs of proximity switches, such as proximity switches 706a and 706b. In such instances, hydraulic system 624 would be coupled to each piston assembly via a pair of hydraulic lines, such as lines 622a and 622b. Additionally, PLC 700 would receive multiple position signals and would respectively allow mold cavities to be filled with concrete and formed blocks to be ejected only when each applicable proximity switch indicates that all moveable liner plates are at their extended position and each applicable proximity switch indicates that all moveable liner plates are at their retracted position.

Figure 18A:
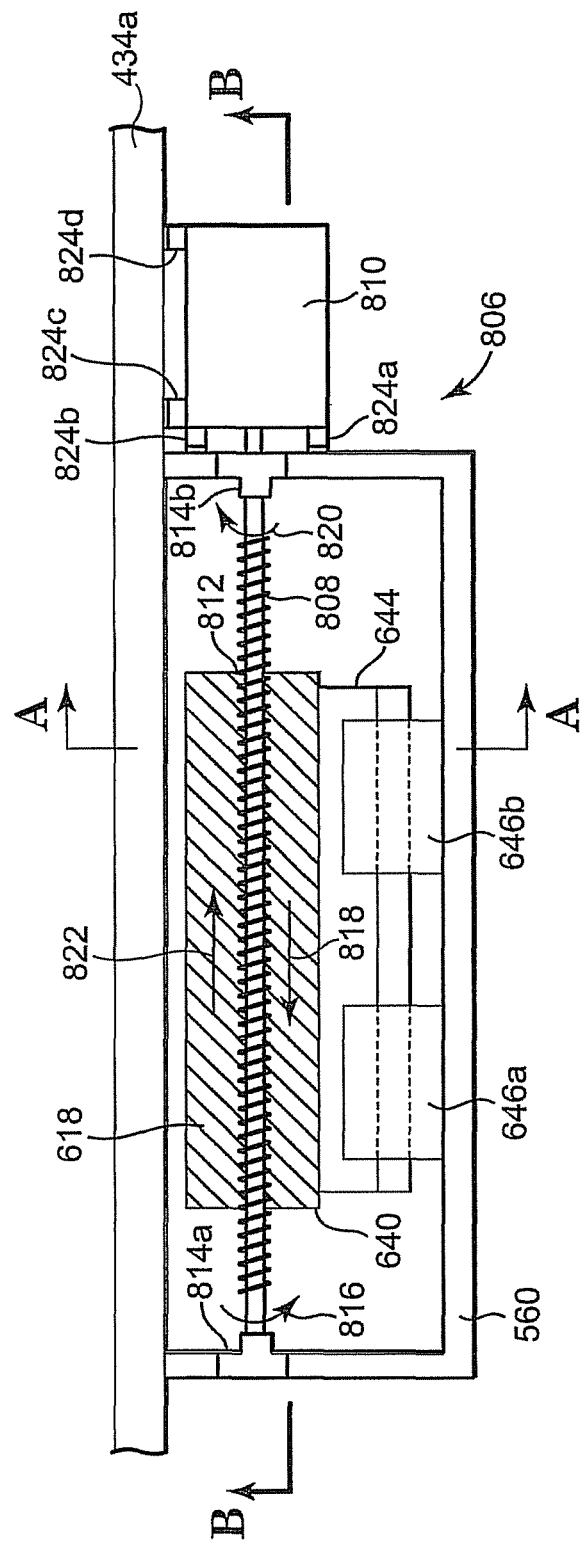
FIG. 18A is a top view illustrating a portion of one exemplary embodiment of gear drive assembly employing a screw drive system according to the present invention.
Figure 18B:
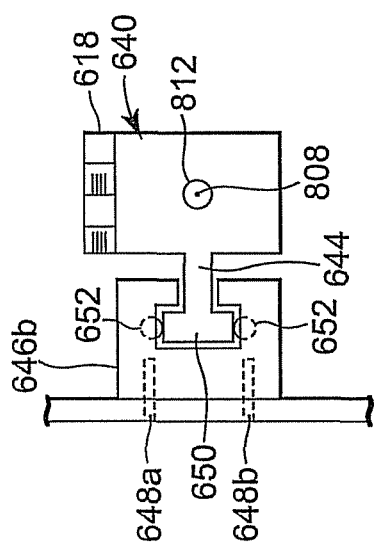
FIG. 18B is a lateral cross-sectional view of the gear drive assembly of FIG. 18A.
Figure 18C:
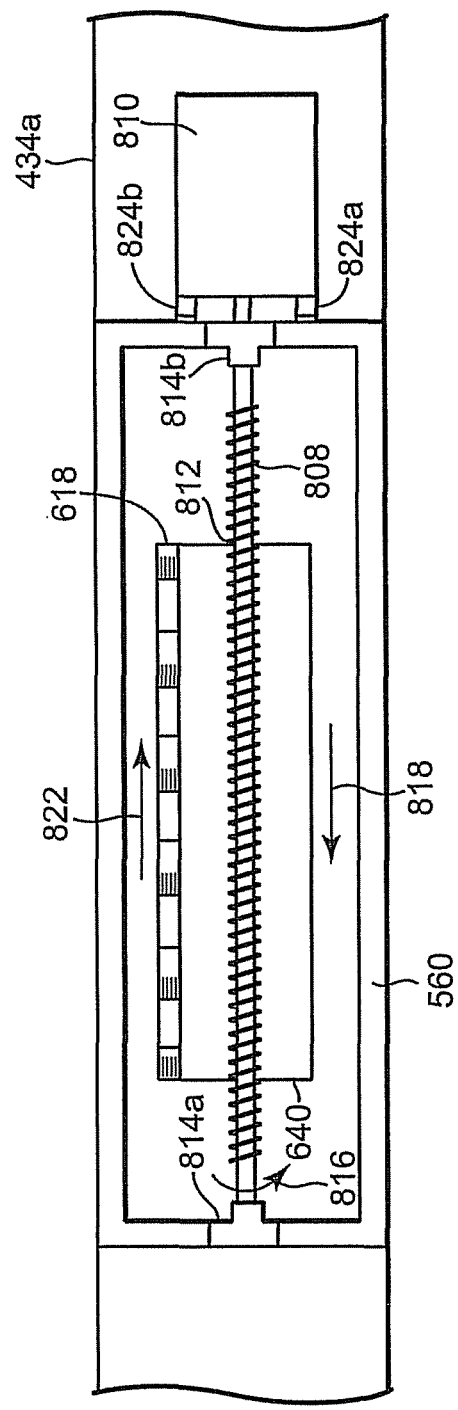
FIG. 18C is a longitudinal cross-sectional view of the gear drive assembly of FIG. 18A.

FIGS. 18A through 18C illustrate portions of an alternate embodiment of drive assembly 550 as illustrated by FIGS. 15A through 15C. FIG. 18A is top view of second gear element 640, wherein second gear element 640 is driven by a screw drive system 806 in lieu of a piston assembly, such as piston assembly 606. Screw drive system 806 includes a threaded screw 808, such as an Acme or Ball style screw, and an electric motor 810. Threaded screw 808 is threaded through a corresponding threaded shaft 812 extending lengthwise through second gear element 640. Threaded screw 808 is coupled at a first end to a first bearing assembly 814a and is coupled at a second end to motor 810 via a second bearing assembly 814b. Motor 810 is selectively coupled via motor mounts 824 to housing 560 and/or to the side/cross members, such as cross member 434a, of the mold assembly.

In a fashion similar to that described by FIG. 15A, second gear element 640 includes the plurality of angled channels 618 which slideably interlock and mesh with angled channels 616 of first gear elements 572b and 572e, as illustrated by FIG. 14. Since second gear element 640 is coupled to linear bearing blocks 646, when motor 810 is driven to rotate threaded screw 808 in a counter-clockwise direction 816, second gear element 640 is driven in a direction 818 along linear bearing track 650. As second gear element 640 moves in direction 818, angled channels 618 interact with angled channels 616 and extend liner plates, such as liner plates 432a through 432f illustrated by FIGS. 12 and 14, toward the interior of mold cavities 446a through 446f.

When motor 810 is driven to rotate threaded screw 808 in a clockwise direction 820, second gear element 640 is driven in a direction 822 along linear bearing track 650. As second gear element 640 moves in direction 822, angled channels 618 interact with angled channels 616 and retract liner plates, such as liner plates 432a through 432f illustrated by FIGS. 12 and 14, away from the interior of mold cavities 446a through 446f. In one embodiment, the distance the liner plates are extended and retracted toward and away from the interior of the mold cavities is controlled based on the pair of proximity switches 706a and 706b, as illustrated by FIG. 14. In an alternate embodiment, travel distance of the liner plates is controlled based on the number of revolutions of threaded screw 808 is driven by motor 810.

FIGS. 18B and 18C respectively illustrate lateral and longitudinal cross-sectional views A-A and B-B of drive assembly 550 as illustrated by FIG. 18A. Although illustrated as being located external to housing 560, in alternate embodiments, motor 810 is mounted within housing 560.

As described above, concrete blocks, also referred to broadly as concrete masonry units (CMUs), encompass a wide variety of types of blocks such as, for example, patio blocks, pavers, light weight blocks, gray blocks, architectural units, and retaining wall blocks. The terms concrete block, masonry block, and concrete masonry unit are employed interchangeably herein, and are intended to include all types of concrete masonry units suitable to be formed by the assemblies, systems, and methods of the present invention. Furthermore, although described herein primarily as comprising and employing concrete, dry-cast concrete, or other concrete mixtures, the systems, methods, and concrete masonry units of the present invention are not limited to such materials, and are intended to encompass the use of any material suitable for the formation of such blocks.

Figure 19:
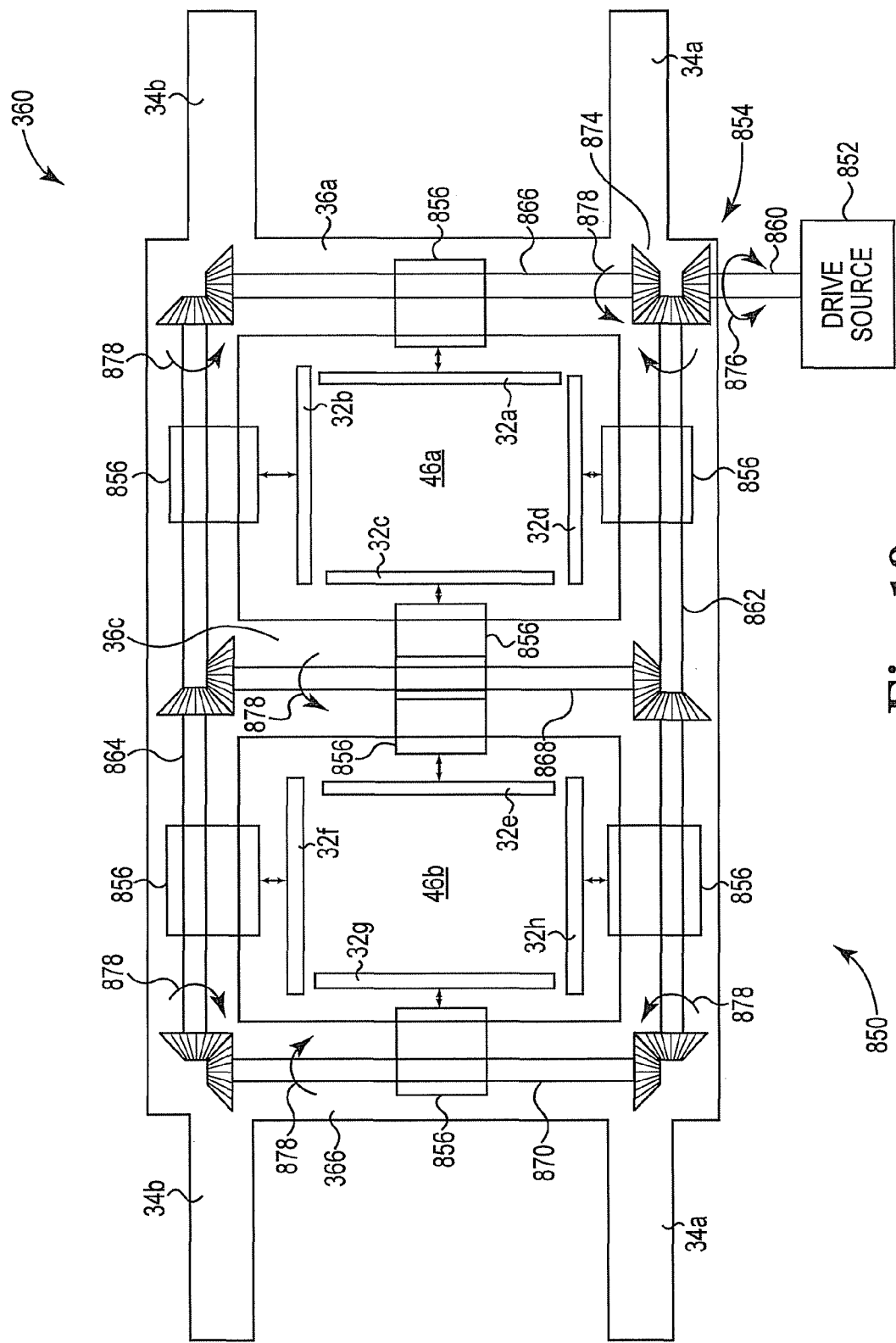
FIG. 19 is a schematic diagram generally illustrating a drive system according to one embodiment.

According to other embodiments, in lieu of using a separate actuator to move each moveable liner plate, such as cylinder/piston 72 (see FIG. 2), a single or common drive system employing a single motor or actuator is employed to move each of the moveable liner plates of the mold assembly. FIG. 19 is a schematic diagram generally illustrating an example of a single drive system 850 according to one embodiment. According to the embodiment of FIG. 19, drive system 850 is configured for use with a mold assembly having two mold cavities, each mold cavity having four moveable liner plates, such as illustrated by mold assembly 360 of FIG. 11A. However, drive system 850 can be readily adapted for use with a mold assembly having any number of mold cavities and moveable liner plates, such as mold assembly 430 of FIG. 12, for example.

According to the embodiment of FIG. 19, drive system 850 includes a drive source 852, a primary or master drive assembly 854 configured to distribute or transmit power from drive source 852 about at least a portion of the perimeters of mold cavities 46a and 46b via side and cross members 34a, 34b, 36a, 36b, 36c, and one or more secondary drive assemblies 856 which are configured to translate or transfer power from primary drive assembly 854 to extend and retract moveable liner plates 32a through 32f toward and away from the interior of corresponding mold cavities 46a and 46b.

According to one embodiment, primary drive assembly 854 comprises a plurality of primary drive shafts 860, 862, 864, 866, 868, and 870. In one embodiment, primary drive shafts 862 and 864 are respectively positioned within side members 34a and 34b, and primary drive shafts 866, 868, and 870 are respectively positioned within cross members 36a, 36b, and 36c of mold cavity 360. Primary drive shaft 860 is coupled to drive source 852, and primary drive shafts 860, 862, 864, 866, 868, and 870 are rotatably coupled to one another via a plurality of beveled gears, such as illustrated by the beveled gears at 872 which couple drive shaft 860 to drive shaft 862, and drive shaft 862 to drive shaft 866.

According to one embodiment, drive source 852 comprises a motor, such as an AC or DC motor, for example, to actuate primary drive assembly 854. According to one embodiment, drive source 854 comprises a DC stepper motor. In one embodiment, drive source 854 comprises a pulse controlled (e.g. pulse width modulated) motor. In one embodiment, drive source 852 comprises a gear train which converts movement of a concrete block machine in which mold assembly 360 is installed (not shown) into rotational movement to drive primary drive shaft 860.

In operation, drive source 852 rotates primary drive shaft 860, as indicated by directional arrow 876, which in-turn, via the pairs of beveled gears, causes rotation of primary shafts 862, 864, 866, 868, and 870. According to one embodiment, rotation of primary drive shaft 860 in a clockwise direction causes rotation of primary drive shafts 862, 864, 866, 868, and 870 in a direction as indicated by the associated rotational arrows 878. Rotation of primary drive shafts 862, 864, 866, 868, and 870, in-turn, causes secondary drive assemblies 856 to drive their corresponding moveable liner plate (e.g. moveable liner plates 32*a*-32*h*) toward or away from an interior of their respective mold cavities 46*a*, 46*b*, depending on the direction of rotation of primary drive shaft 860. It is noted that drive source 852 may be controllable to control a desired distance of travel of moveable liner plates 32*a*-32*h* toward and away from the interior of their respective mold cavities 46*a*, 46*b*.

Figure 20:
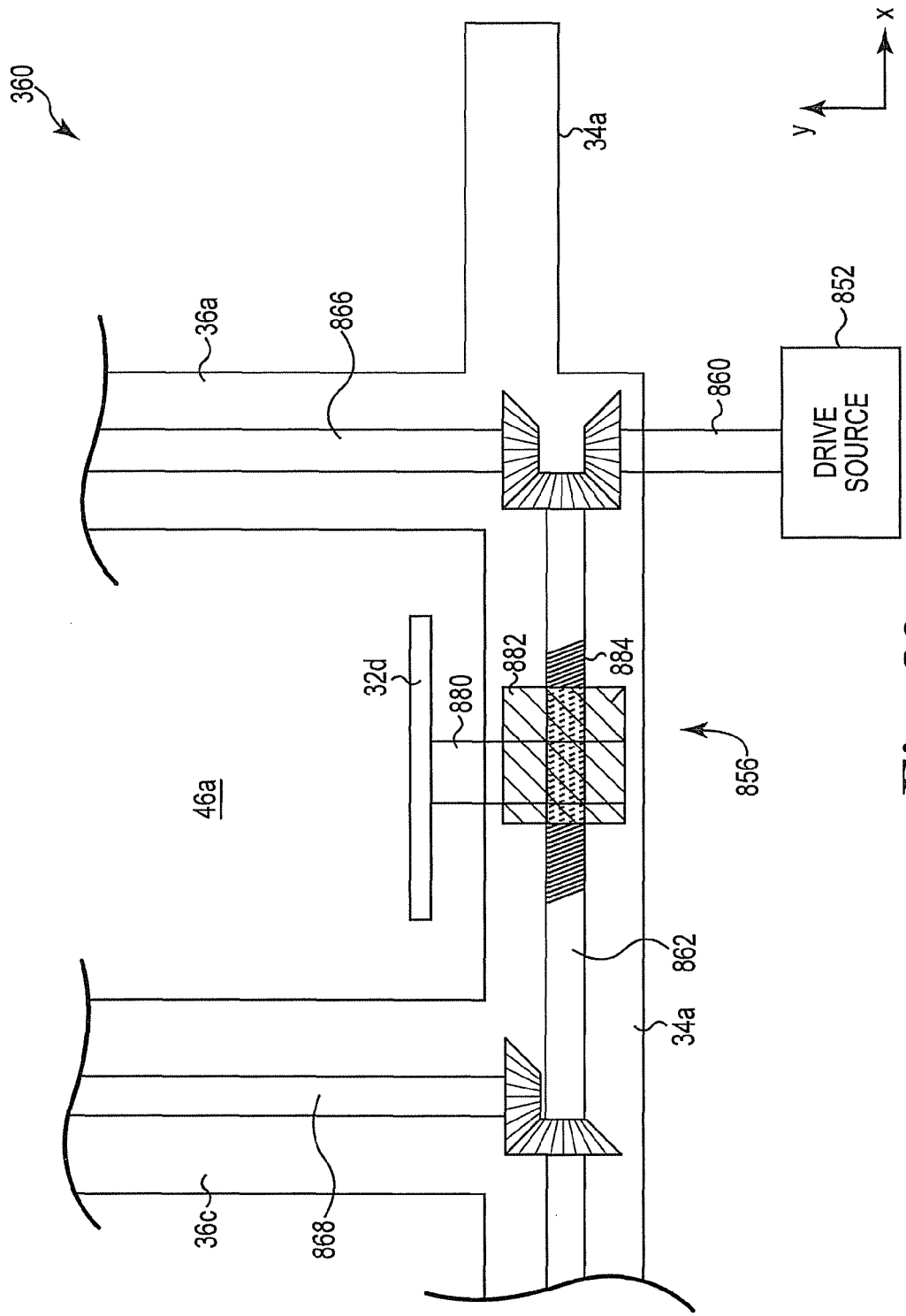
FIG. 20 is a top view of a mold assembly generally illustrating portions of a drive system according to one embodiment.

FIGS. 20 through 26 illustrate examples of secondary drive assemblies 856 according to various embodiments. FIG. 20 shows a portion of mold assembly 360 and illustrates an example of a second drive assembly 856 according to one embodiment. According to the embodiment of FIG. 20, secondary drive assembly 856 includes first and second drive elements 880 and 882, which include interlocking angled channels and are similar to gear plates 72 and 74 illustrated above (e.g. FIGS. 2-10). First drive element 880 is restricted from moving in the x-direction, and second drive element 882 is restricted from moving in the y-direction.

According to one embodiment, secondary drive assembly 856 further includes an external threaded portion 884 (i.e. male thread) of primary drive shaft 862, which is threaded through a corresponding internal threaded portion (i.e. female thread) of second drive element 882. In operation, as primary drive shaft 862 is driven in a clockwise/counter-clockwise direction, second drive element 882 moves back and forth in the x-direction along primary drive shaft 862 with the interlocking angled channels, in turn, driving first drive element 880 (and moveable liner plate 32*d* selectively coupled thereto) in the y-direction toward/away from the interior of mold cavity 46*a*. It is noted that the number of turns required by primary drive shaft 862 to drive moveable liner plate 32*d* a given distance toward or away from the interior of mold cavity 46*a* depends on a particular thread configuration (e.g. diameter, pitch) employed for threaded portion 884.

Figure 21:
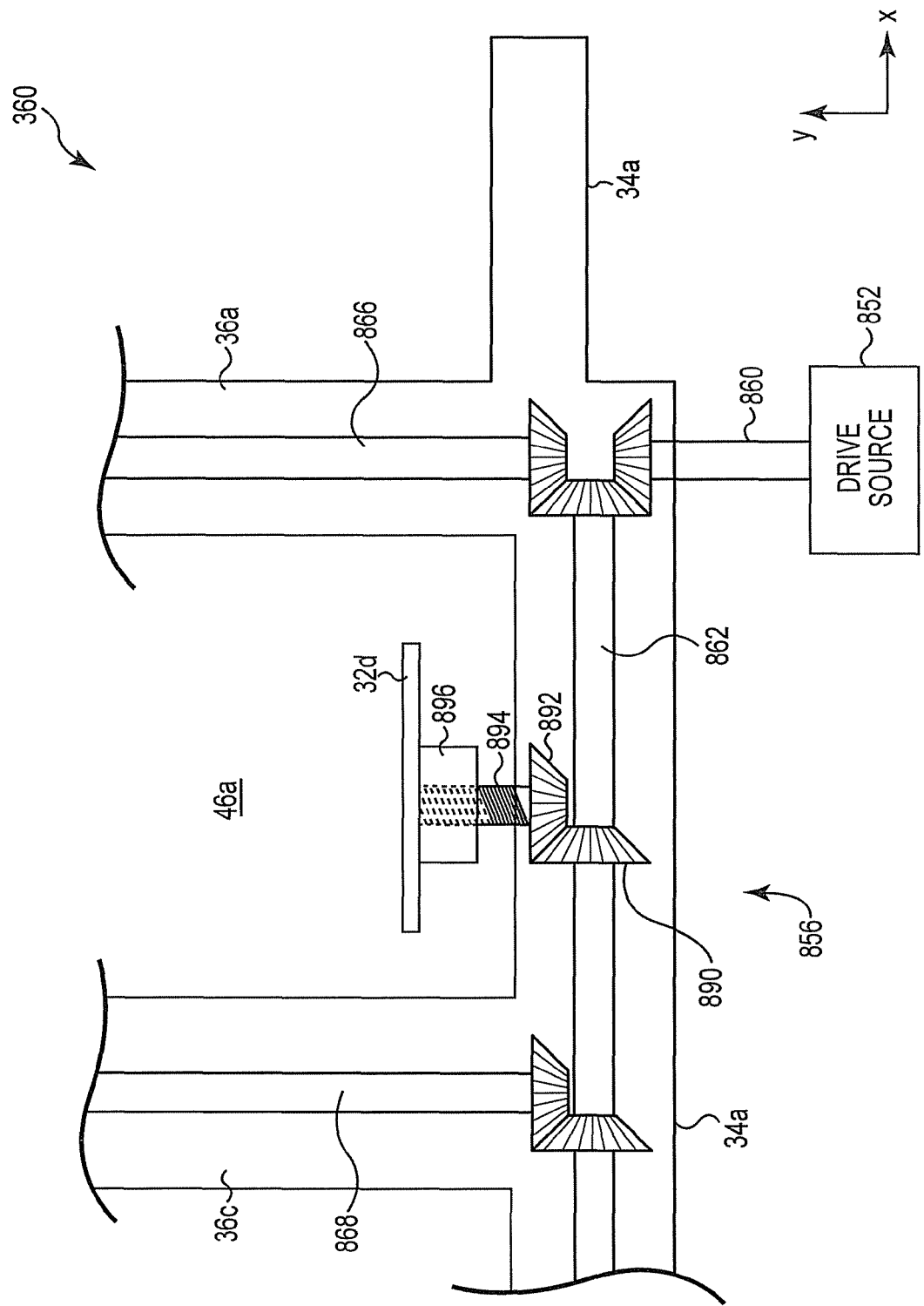
FIG. 21 is a top view of a mold assembly generally illustrating portions of a drive system according to one embodiment.

FIG. 21 shows a portion of mold assembly 360 and illustrates another example of a secondary drive assembly 856 according to one embodiment. According to the embodiment of FIG. 21, secondary drive assembly 856 includes a pair of beveled gears 890 and 892, with beveled gear 890 mounted to primary drive shaft 862 and beveled gear 892 coupled to a secondary drive shaft 894. Secondary drive shaft 894 has an external thread (i.e. "male" thread) and is thread into an internal threaded portion (i.e. "female" thread) of an element 896, which is selectively coupled to moveable liner plate 32*d* and is restricted from moving in the x-direction.

In operation, as primary drive shaft 862 is driven in a clockwise/counter clockwise direction, the pair of beveled gears 890, 892 causes secondary drive shaft 894 to rotate in a clockwise/counter clockwise direction. The rotation of secondary drive shaft 894, via the male/female threads, drives element 896 and moveable liner plate 32*d* in the y-direction toward and away from the interior of mold cavity 46*a*.

Figure 22:
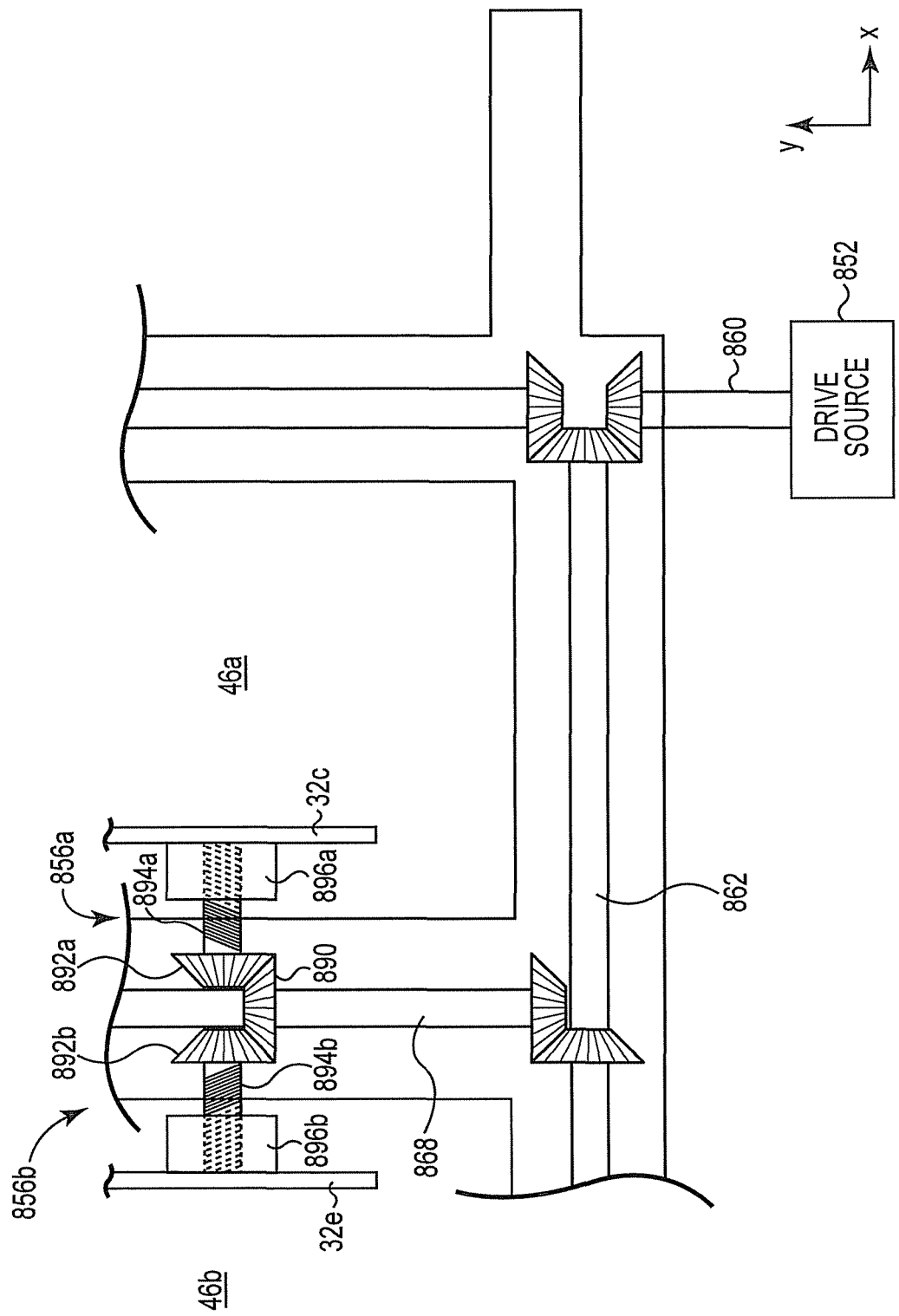
FIG. 22 is a top view of a mold assembly generally illustrating portions of a drive system according to one embodiment.

FIG. 22 shows a pair of secondary drive assemblies 856*a* and 856*b*, as illustrated by FIG. 21, in combination with one another and arranged to respectively drive moveable liner plates 32*c* and 32*e* toward and away from the interiors of mold cavities 46*a* and 46*b*. It is noted that the single beveled gear 890 coupled to primary drive shaft 868 drives both secondary drive shafts 894*a* and 894*b* via beveled gears 892*a* and 892*b*.

Figure 23:
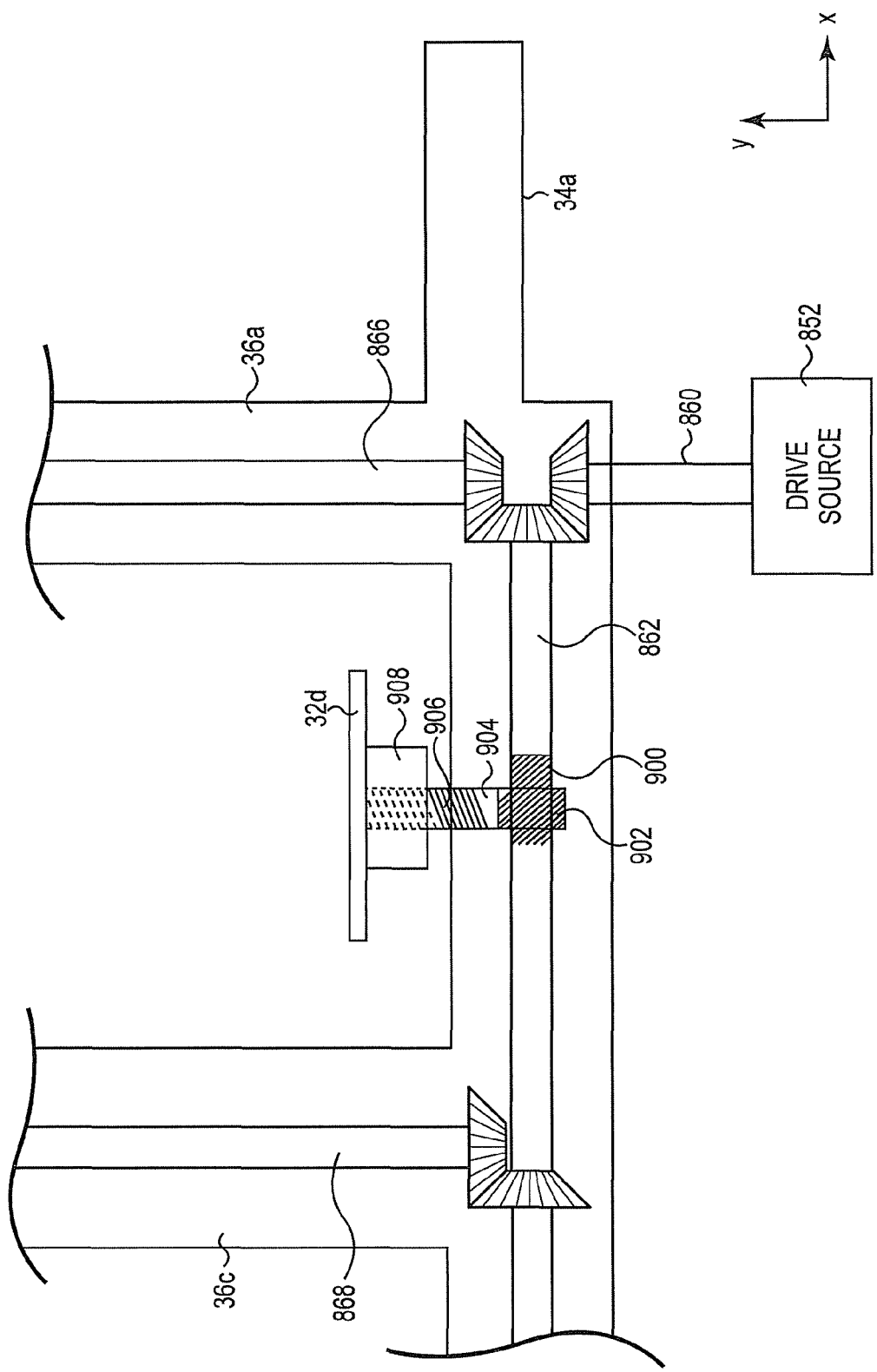
FIG. 23 is a top view of a mold assembly generally illustrating portions of a drive system according to one embodiment.

FIG. 23 shows a portion of mold assembly 360 and illustrates another example of a secondary drive assembly 856 according to one embodiment. According to the embodiment of FIG. 21, secondary drive assembly 856 includes a pair of cross-helical gears 900 and 902, with helical gear 900 coupled to and configured to rotate with primary drive shaft 862, and helical gear coupled to a secondary drive shaft 904. According to one embodiment, primary and secondary drive shafts 862 and 904 are machined such that helical gears 900 and 902 are integral part of primary and secondary drive shafts 862 and 904. Secondary drive shaft 904 further includes an externally threaded portion 906 (i.e. "male" thread) which is threaded into an internally threaded portion (i.e. "female" thread) of an element 908 coupled to moveable liner plate 32*d*, where element 908 is restricted from moving the x-direction.

In operation, as primary drive shaft 862 is driven in a clockwise/counter-clockwise direction by drive source 852, cross-helical gears 900 and 902 drive secondary drive shaft 904 in clockwise/counter-clockwise direction. In turn, rotation of secondary drive shaft 904, via the male/female threads, drives element 908 and moveable liner plate 32*d* in the y-direction toward and away from the interior of mold cavity 46*a*.

Figure 24:
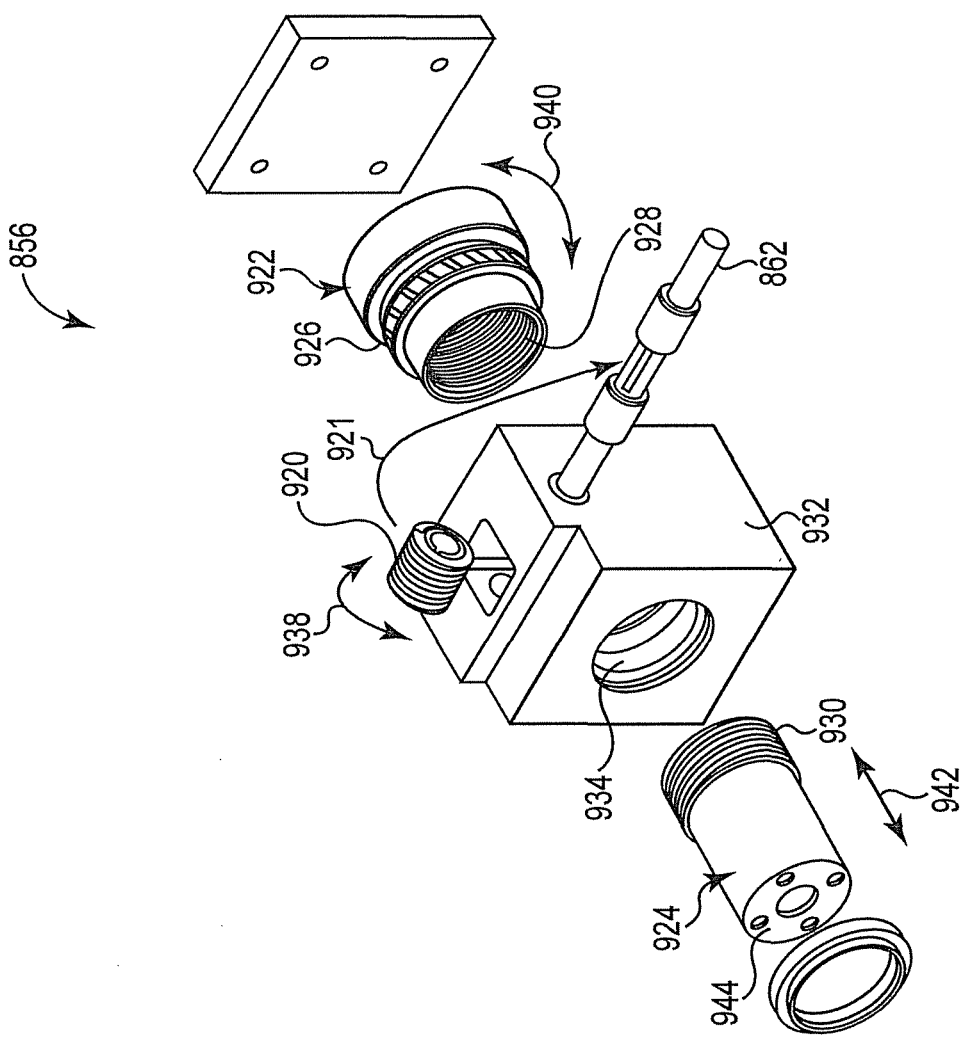
FIG. 24 is an exploded view illustrating portions of a drive assembly according to one embodiment.

FIG. 24 is an exploded view illustrating portions of a secondary drive assembly 856 employing a cross-helical gear configuration according to another embodiment. According to the embodiment of FIG. 24, secondary drive assembly 856 includes a helical gear 920 which is mounted to primary drive shaft 862 (at a position as indicated by the arrow at 921), a first drive element 922, and a second drive element 924. First drive element 922 includes an external helical gear 926 which meshes with helical gear 920 mounted to primary drive shaft 862 to form a cross-helical gear pair. First drive element 922 further includes an internal threaded portion (i.e. "female" thread) 928. Second drive element 924 includes an external threaded portion (i.e. "male" thread) 930 which threads into the internal threaded portion 928 of first drive element 922.

Helical gear 920 and first drive element 922 are positioned within a housing 932 through which primary drive shaft 862 extends, and which allows only rotational movement of helical gear 920 and first drive element 922. Second drive element 924 extends from housing 932 via an opening 934.

In operation, rotation of primary drive shaft 862 causes helical gear 920 to rotate (as illustrated by the rotational arrow at 938) and, via external helical gear 926, causes first drive element 922 to rotate (as illustrated by the rotational arrow at 940) in a direction which is perpendicular to the direction of ration of helical gear 920. In turn, rotation of first drive element 922 causes linear movement of second drive element 924 (as indicated by the directional arrow at 942) via internal and external threads 928 and 930. According to one embodiment, second drive element 924 is coupled to a moveable liner plate (e.g. moveable liner plate 32d) at an end 944 opposite threaded ended so that linear movement of second drive element 924 moves the moveable liner plate toward and away from an interior of a corresponding mold cavity.

Figure 25:
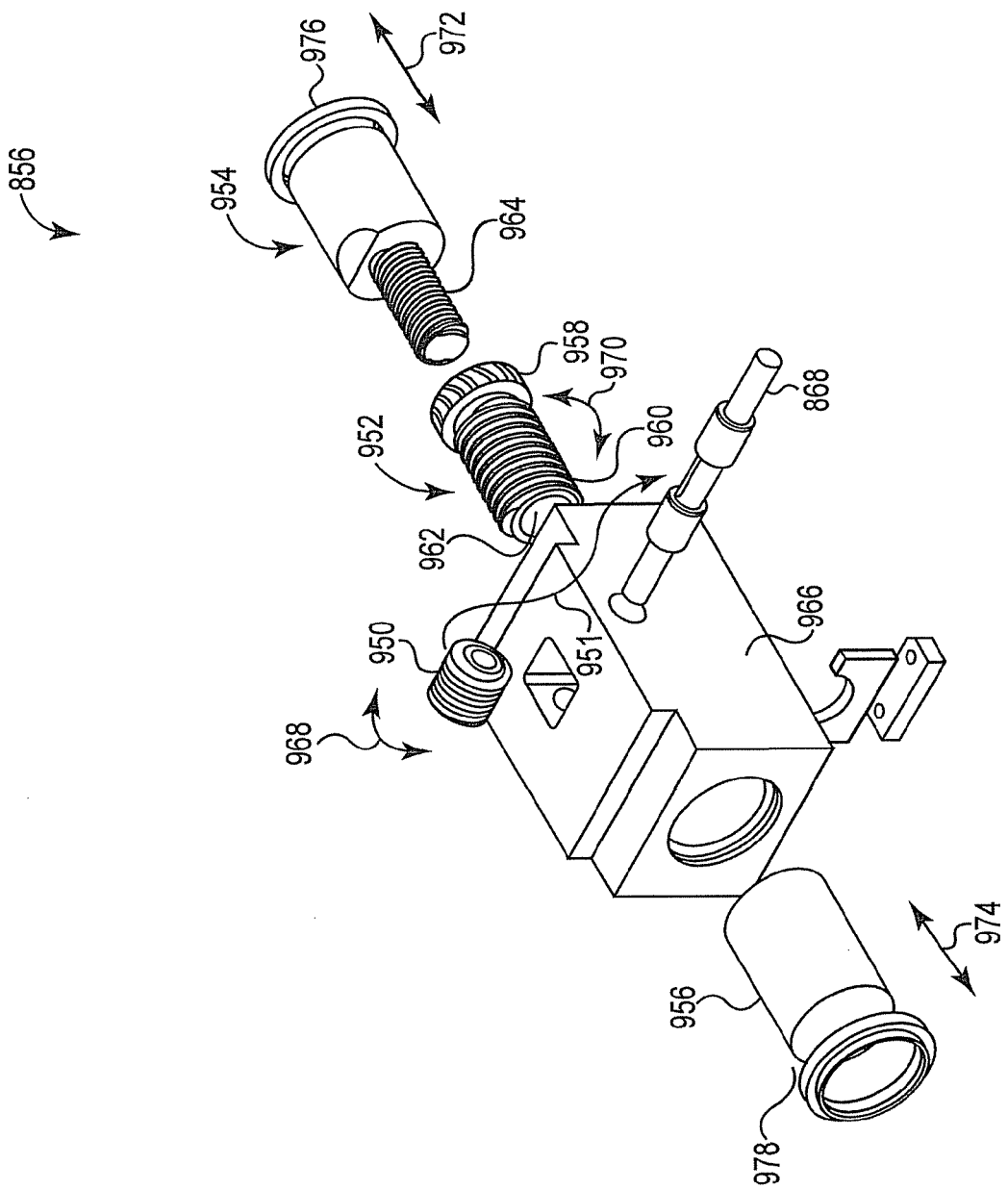
FIG. 25 is an exploded view illustrating portions of a drive assembly according to one embodiment.

FIG. 25 is an exploded view illustrating portions of a secondary drive assembly 856 employing a cross-helical gear configuration according to another embodiment. According to the embodiment of FIG. 25, secondary drive assembly 856 includes a helical gear 950 which is mounted to primary drive shaft 868 (at a position as indicated by the arrow at 951), a first drive element 952, a second drive element 954, and a third drive element 956.

First drive element 952 includes an external helical gear 958 which meshes with helical gear 950 mounted to primary drive shaft 868 to form a cross-helical gear pair. First gear element 952 further includes an external threaded portion 960 (i.e. "male" thread) and an internal threaded portion 962 (i.e. "female" thread). Second gear element 954 includes an externally threaded shaft 964 which threads into the internal thread portion 962 of first drive element 952. Third drive element 956 is internally threaded (not shown) and is configured to thread onto the external threaded portion 960 of first drive element 952.

Helical gear 950 and first drive element 952 are positioned within a housing 966 through which primary drive shaft 868 extends, and which allows only rotational movement of helical gear 950 and first drive element 952. Second and third drive elements 954 and 956 extend from housing 966 via respective openings.

In operation, rotation of primary drive shaft 868 causes helical gear 950 to rotate (as illustrated by the rotational arrow at 968) and, via external helical gear 958, causes first drive element 952 to rotate (as illustrated by the rotational arrow at 970) in a direction which is perpendicular to the direction of ration of helical gear 950. In turn, rotation of first drive element 922 causes linear movement of second drive element 954 (as indicated by the directional arrow at 972) via turning of internal and external threads 962 and 964, and linear movement of third drive element 956 (as indicated by the direction arrow at 974) via turning of external thread 960 of first drive element 952 and the internal threads of third drive element 956.

According to one embodiment, second drive element 954 is coupled to a moveable liner plate (e.g. moveable liner plate 32c) at an end 976 opposite threaded shaft 964, and third drive element 956 is coupled to a moveable liner plate (e.g. moveable liner plate 32e) so that linear movement of second and third drive elements 954 and 956 moves the respective moveable liner plate toward and away from an interior of a corresponding mold cavity (e.g. mold cavities 46a, 46b). By employing both internal and external threads 962, 964, secondary drive assembly 856 requires less space than that required by the secondary drive assembly described by FIG. 26 below, and requires approximately the same amount of space required to drive only a single moveable liner plate described by the assembly of FIG. 24.

Figure 26:
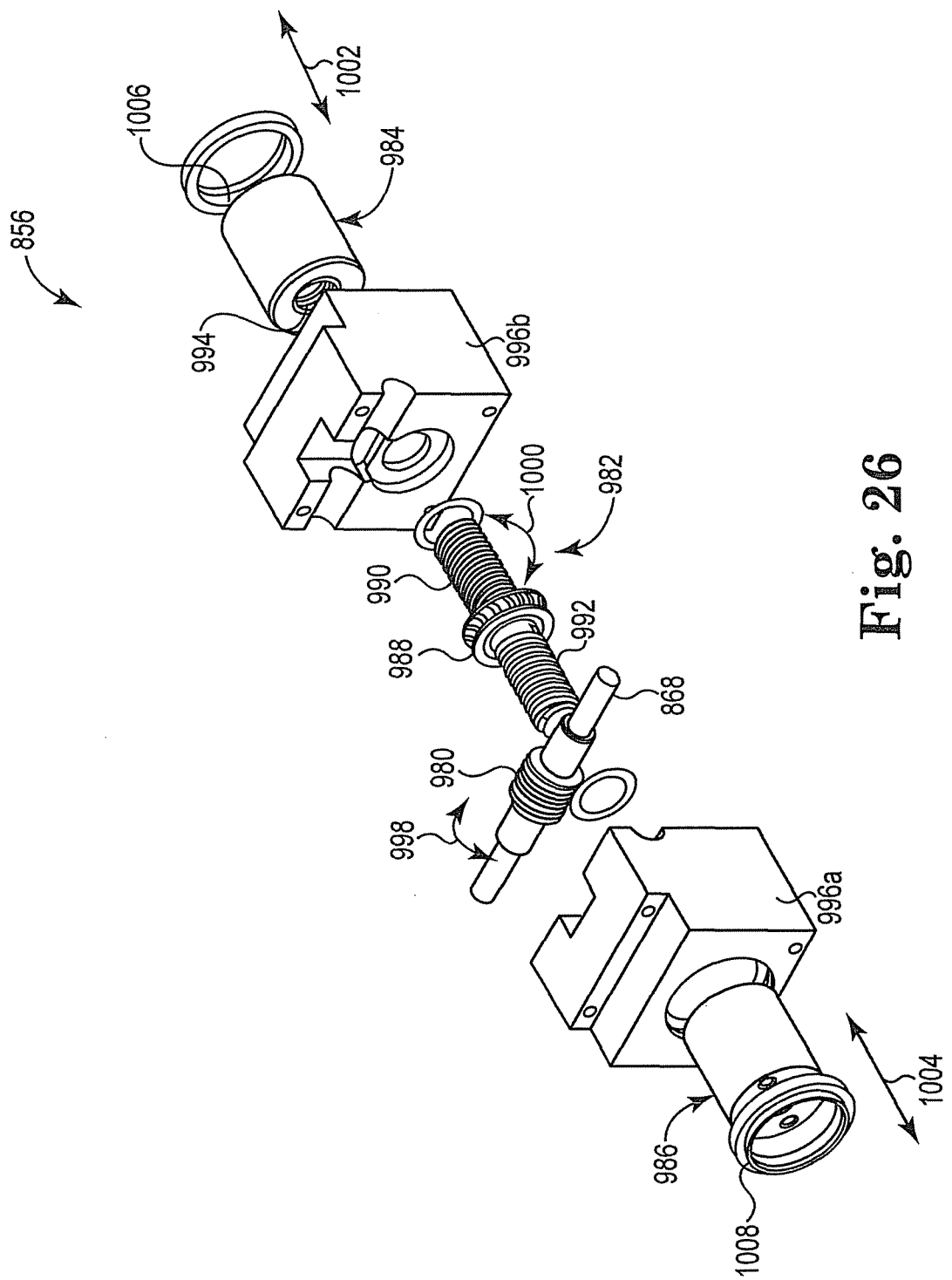
FIG. 26 is an exploded view illustrating portions of a drive assembly according to one embodiment.

FIG. 26 is an exploded view illustrating portions of a secondary drive assembly 856 employing a cross-helical gear configuration according to another embodiment. According to the embodiment of FIG. 26, secondary drive assembly 856 includes a helical gear 980 which is mounted to primary drive shaft 868, a first drive element 982, a second drive element 984, and a third drive element 986.

First drive element 982 includes an external helical gear 988 which meshes with helical gear 980 mounted to primary drive shaft 868 to form a cross-helical gear pair. First gear element 982 further includes a first external threaded portion 990 (i.e. "male" thread) and a second external threaded portion 992 (i.e. "male" thread). Second gear element 984 includes an internally portion 994 which threads onto the first external threaded portion 990 of first drive element 982. Third drive element 986 is internally threaded (not shown) and is configured to thread onto the second external threaded portion 992 of first drive element 982.

Helical gear 980 and first drive element 982 are positioned within a housing 996 (illustrated as component parts 996a, 996b) through which primary drive shaft 868 extends, and which allows only rotational movement of helical gear 980 and first drive element 982. Second and third drive elements 984 and 986 extend from housing 996 via respective openings.

In operation, rotation of primary drive shaft 868 causes helical gear 980 to rotate (as illustrated by the rotational arrow at 998) and, via external helical gear 988, causes first drive element 982 to rotate (as illustrated by the rotational arrow at 1000) in a direction which is perpendicular to the direction of ration of helical gear 980. In turn, rotation of first drive element 982 causes linear movement of second drive element 984 (as indicated by the directional arrow at 1002) via turning of external and internal threads 990 and 994, and linear movement of third drive element 986 (as indicated by the direction arrow at 1004) via turning of external thread 992 of first drive element 922 and the internal threads of third drive element 986.

According to one embodiment, second drive element 984 is coupled to a moveable liner plate (e.g. moveable liner plate 32c) at an end 1006 and third drive element 986 is coupled to a moveable liner plate (e.g. moveable liner plate 32e) at an end 1008 so that linear movement of second and third drive elements 984 and 956 moves the respective moveable liner plate toward and away from an interior of a corresponding mold cavity (e.g. mold cavities 46a, 46b).

Although described so far primarily as comprising a plurality of drive shafts 860-870 coupled via sets of beveled gears 874, primary drive assembly 854 may be configured using other systems as well. For example, according to one embodiment, in lieu of drive shafts and beveled gear pairs, primary drive assembly 854 may be configured using a cable (or cables) and pulleys to direct the cable through the various side- and cross-members of the mold assembly, with the cable being wrapped around drums in order to drive the various second drive assemblies and move the moveable liner plates.

Figure 27:
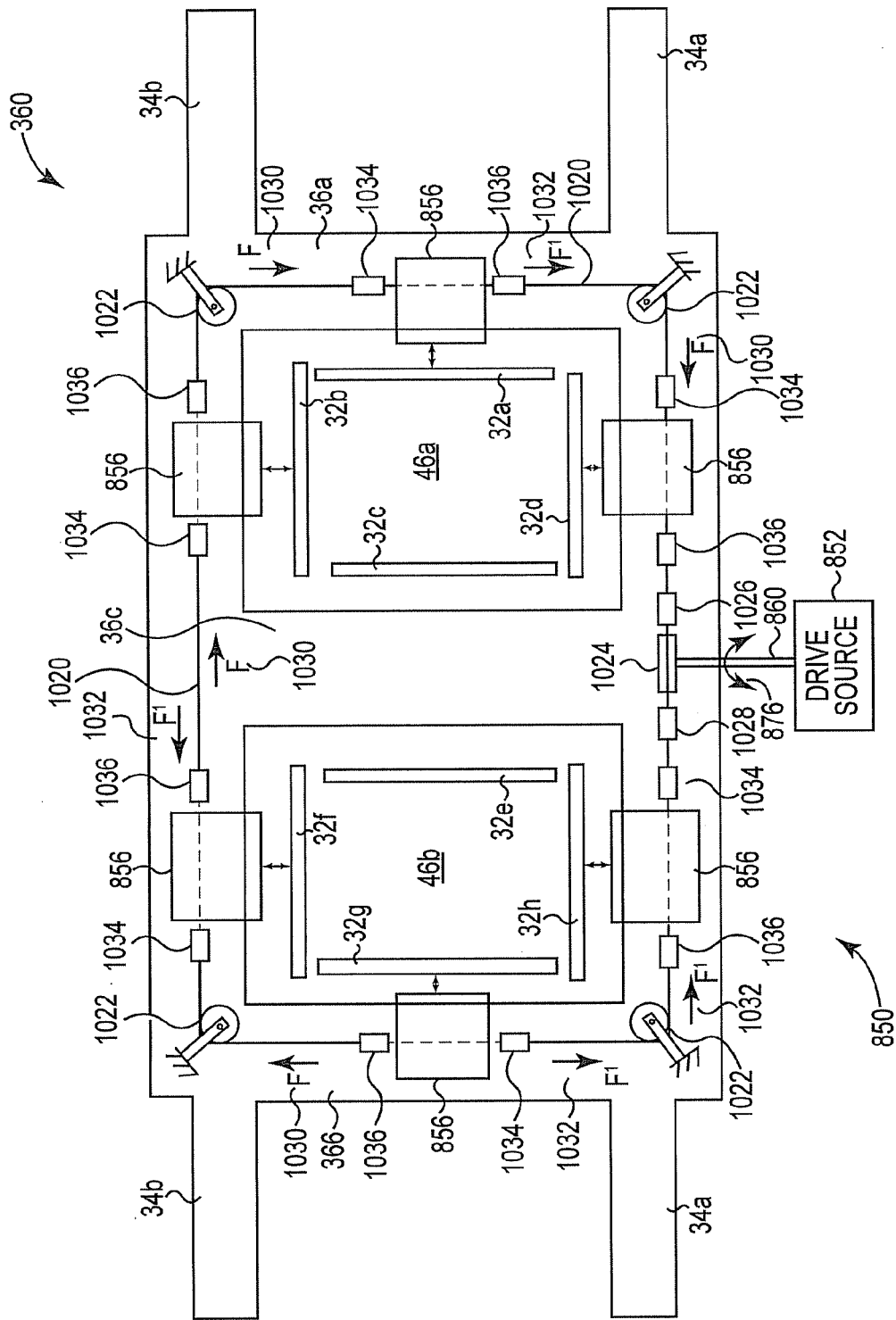
FIG. 27 is a schematic diagram generally illustrating a drive system according to one embodiment.

FIG. 27 is a schematic diagram generally illustrating one embodiment of drive system 850 wherein primary drive assembly comprises a drive cable 1020 transmitting power about mold assembly 360 in lieu of drive shafts 860-870 and associated beveled gears 874. According to the embodiment illustrated by FIG. 27, drive cable 1020 comprises a loop which is routed about at least a portion of the exterior of mold cavities 46a, 46b via side and cross members 34a, 34b, 36a, 36b using a series of pulleys, such as pulleys 1022, mounted to side and cross members 34a, 34b, 36a, 36b. According to one embodiment, pulleys 1022 are spring loaded to maintain a tension on drive cable 1020. Although not shown for ease of illustration, through use of additional pulleys/wheels, drive cable 1020 can be routed within cross member 36c as well.

According to one embodiment, drive source 852 comprises a motor which is coupled via drive shaft 860 to a drum 1024 about which drive cable 1020 is wrapped and held in tension with by a pair of tension wheels or pulleys 1026, 1028, one of which is stationary and one of which is able to move and apply a force against drive cable 1020. In operation, drive source 852 rotates drive shaft 860, and indicated by directional arrow 876, which in-turn rotates drum 1024 and drives drive cable 1020 back and forth about the perimeter of mold cavities 46a and 46b. For example, according to one embodiment, driving drum 1024 in a counter-clockwise direction causes drive cable 1020 to be driven in a clock-wise direction, with respect to FIG. 27, and generates a force F, as indicated at 1030, in a first direction along each side and cross member 34a, 34b, 36a, 36b and which is substantially parallel to corresponding liner plate(s) 32.

Similarly, driving drum 1024 a clockwise direction causes drive cable 1020 to be driven in a clock-wise direction and generates a force F' 1032 in a second direction, opposite the first direction, along each side and cross member 34a, 34b, 36a, 36b and which is substantially parallel to the corresponding liner plate(s) 32. It is noted that instead of providing a rotational force about an axis which is normal to mold cavities 46a, 46b, such as the rotational force 878 provided by drives shafts 860-870 (see FIG. 19), drive cable 1020 distributes linear forces 1030, 1032 which are substantially parallel to liner plates 32.

According to one embodiment, a pair of tensioning wheels or pulleys 1034, 1036, which will be described in greater detail below, are positioned on each side of secondary drive assembly 856 so that drive cable 1020 is under tension as it interacts with and secondary drive assemblies 856, which employ or translate forces F, F' 1030, 1032 to extend and retract liner plates 32 toward and away from the interiors of mold cavities 46a, 46b. According to one embodiment, one of the wheels or pulleys 1034, 1036 is stationary, while the other is able to move and apply a force against drive cable 1020.

Figure 28:
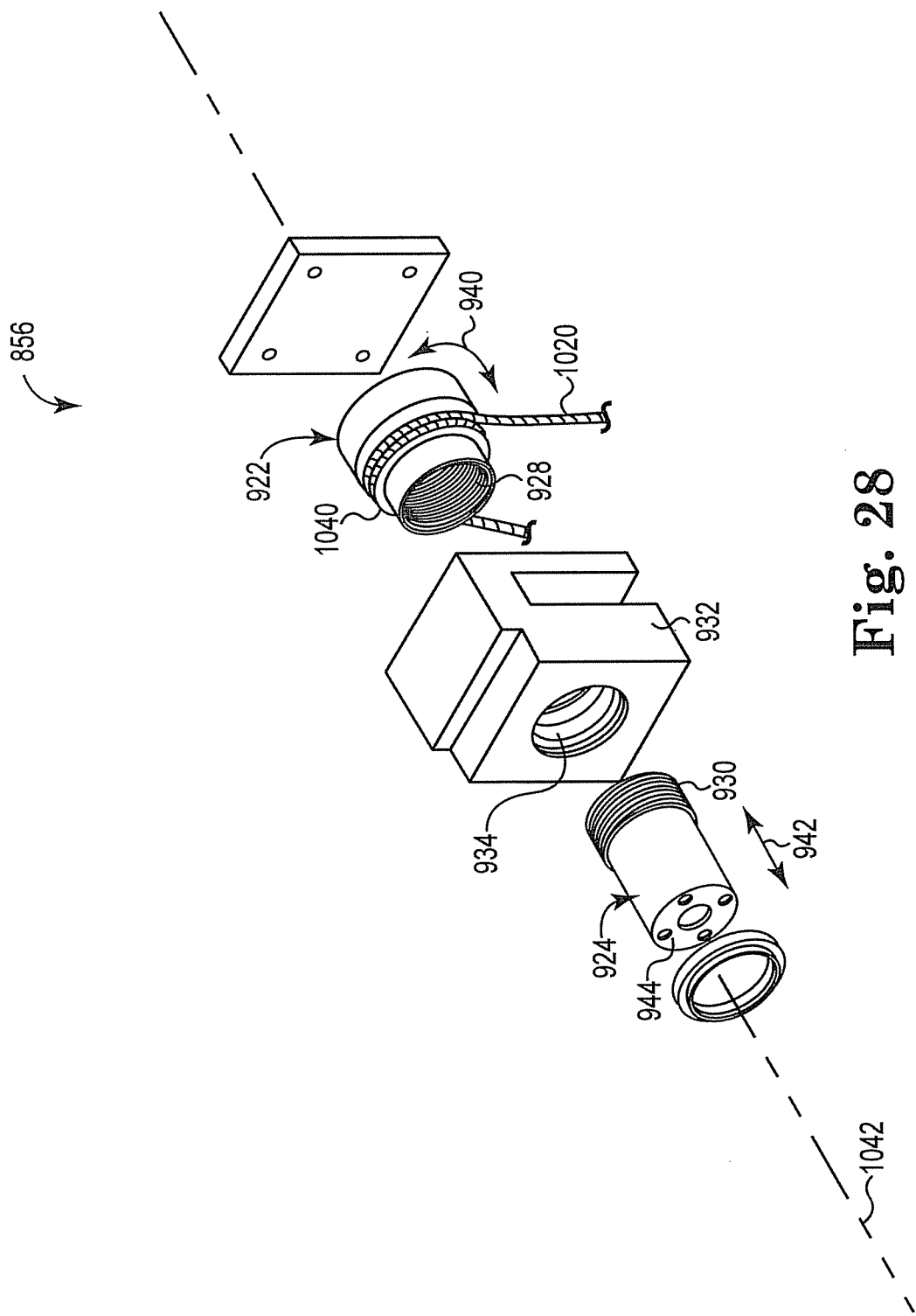
FIG. 28 is an exploded view illustrating portions of a drive assembly according to one embodiment.

FIG. 28 is an exploded view illustrating portions of one embodiment of a secondary drive assembly 856 configured for use with drive cable 1020. Secondary drive assembly 856 of FIG. 28 is similar to that illustrated by FIG. 24, except that helical gears 920 and 926 are no longer employed. Instead, first drive element 922 includes a drum or wheel portion 1040 about which drive cable 1020 is wrapped. As will be described in greater detail below by FIG. 31, tension wheels or pulleys 1034, 1036 are positioned on each side of drum 1040 of first drive element 922 to maintain tension on drive cable 1020 as it passes around drum 1040.

As described above, with reference to FIG. 24, first drive element 922 is restricted by housing 932 to only rotational movement about an axis 1042 which is perpendicular or normal to a moveable liner plate (not illustrated in FIG. 28) coupled to second drive element 924, and second drive element is limited to only linear movement along axis 1042. In operation, as drive cable 1020 is driven back and forth by drive source 852, forces F and F' 1030, 1032, which are substantially parallel to the associated moveable liner plate (and normal to axis 1042) cause first drive element 922 to rotate, as illustrated by rotational arrow 940. In turn, rotation of first drive element 922 drives second drive element 924, via interaction between internal and external threads 928 and 930, linearly back-and-forth along axis 1042, as indicated by directional arrow 942, and thereby extends and retracts the corresponding liner plate 32 coupled to second drivel element 924 toward and away from the interior of the corresponding mold cavity.

Figure 29:
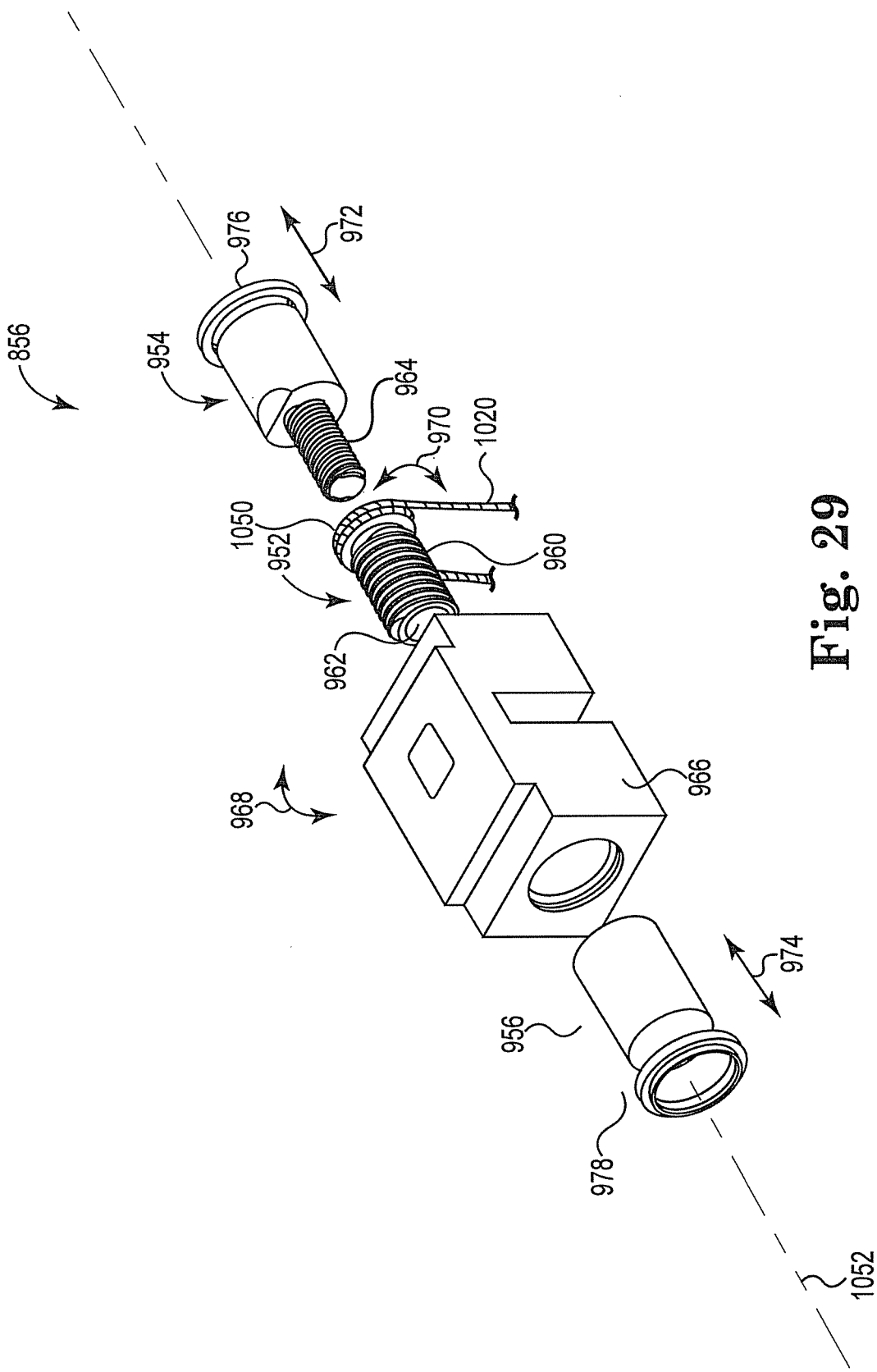
FIG. 29 is an exploded view illustrating portions of a drive assembly according to one embodiment.

FIG. 29 is an exploded view illustrating portions of one embodiment of a secondary drive assembly 856 configured for use with drive cable 1020. Secondary drive assembly 856 of FIG. 29 is similar to that illustrated by FIG. 25, except that helical gear 950 and helical gear 958 of first drive element 952 are no longer employed. Instead, first drive element 952 includes a drum or wheel portion 1050 about which drive cable 1020 is wrapped. As will be described in greater detail below by FIG. 31, tension wheels or pulleys 1034, 1036 are positioned on each side of drum 1050 of first drive element 952 to maintain tension on drive cable 1020 as it passes around drum 1050.

As described above, with reference to FIG. 25, first drive element 952 is restricted by housing 966 to only rotational movement about an axis 1052 which is perpendicular or normal to moveable liner plates (not illustrated in FIG. 28) that are coupled to second and third drive elements 954 and 956, and second and third drive element 954 and 956 are limited to only linear movement along axis 1052. In operation, as drive cable 1020 is driven back and forth by drive source 852, forces F and F' 1030, 1032, which are substantially parallel to the associated moveable liner plates (and normal to axis 1052) cause first drive element 952 to rotate, as illustrated by rotational arrow 970. In turn, rotation of first drive element 952 drives second and third drive elements 954 and 956, via interaction between internal and external threads, linearly back-and-forth along axis 1042, as indicated by directional arrows 972 and 974, and thereby extends and retracts the corresponding liner plates 32 coupled to second and third drive element 954 and 956 toward and away from the interior of the corresponding mold cavity.

Figure 30:
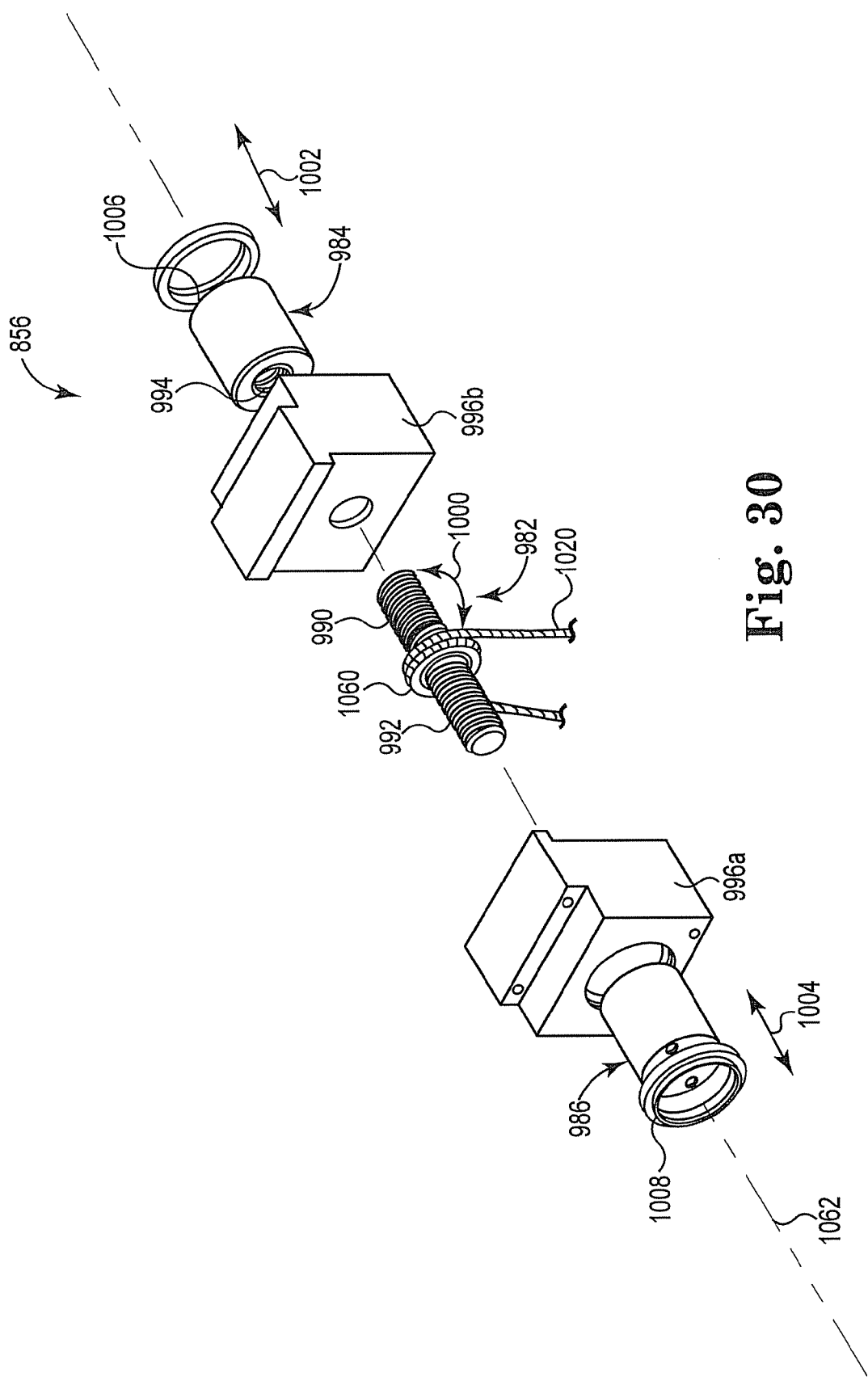
FIG. 30 is an exploded view illustrating portions of a drive assembly according to one embodiment.

FIG. 30 is an exploded view illustrating portions of one embodiment of a secondary drive assembly 856 configured for use with drive cable 1020. Secondary drive assembly 856 of FIG. 30 is similar to that illustrated by FIG. 26, except that helical gear 980 and helical gear 988 of first drive element 952 are no longer employed. Instead, first drive element 982 includes a drum or wheel portion 1060 about which drive cable 1020 is wrapped. As will be described in greater detail below by FIG. 31, tension wheels or pulleys 1034, 1036 are positioned on each side of drum 1060 of first drive element 982 to maintain tension on drive cable 1020 as it passes around drum 1060.

As described above, with reference to FIG. 26, first drive element 982 is restricted by housing 966 to only rotational movement about an axis 1062 which is perpendicular or normal to moveable liner plates that are coupled to second and third drive elements 984 and 986 (not illustrated in FIG. 28), with second and third drive element 984 and 986 being limited to only linear movement along axis 1062. In operation, with further reference to FIG. 27, as drive cable 1020 is driven back and forth by drive source 852, forces F and F' 1030, 1032, which are substantially parallel to the associated moveable liner plates (and normal to axis 1062) cause first drive element 982 to rotate, as illustrated by rotational arrow 1000. In turn, rotation of first drive element 982 drives second and third drive elements 984 and 986, via interaction between internal and external threads, linearly back-and-forth along axis 1062, as indicated by directional arrows 1002 and 1004, and thereby extends and retracts the corresponding liner plates 32 coupled to second and third drive element 984 and 986 toward and away from the interior of the corresponding mold cavity.

Figure 31:
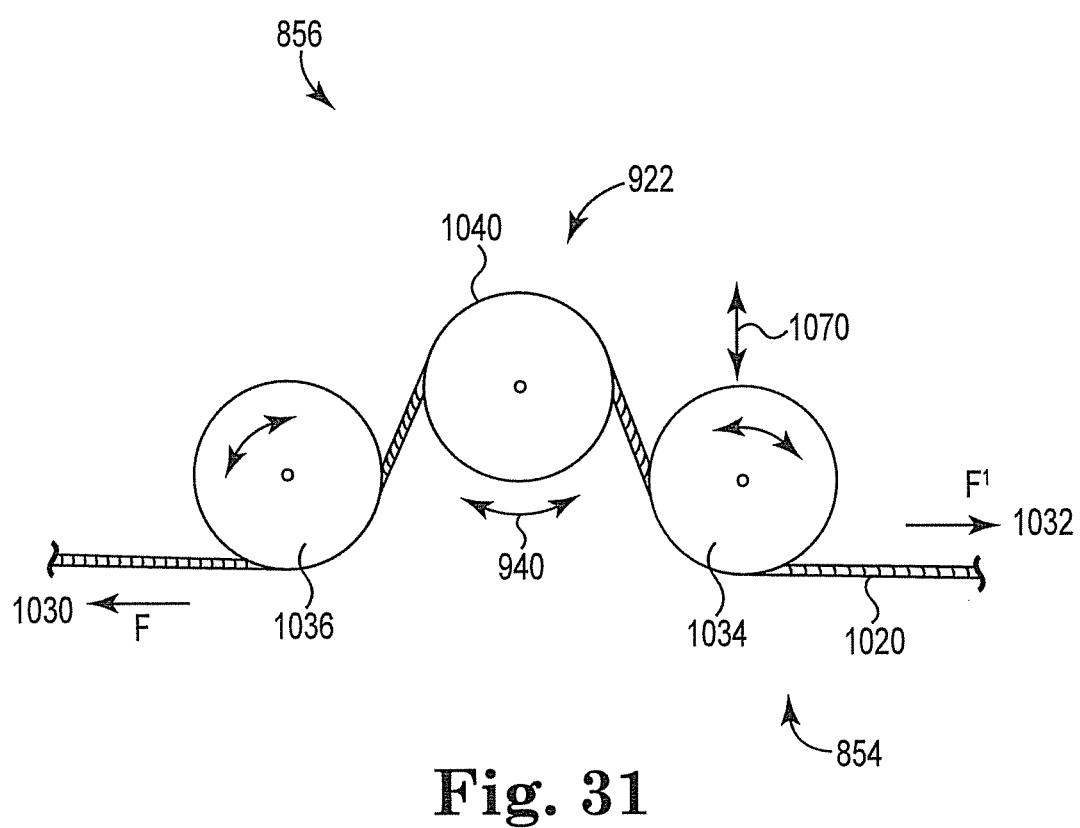
FIG. 31 is a diagram generally illustrating portions of a drive system according to one embodiment.

FIG. 31 is a schematic diagram illustrating portions of primary drive assembly 854 and secondary drive assembly 856, according to one embodiment, and shows and example of a configuration of tensioning wheels 1034 and 1036 of primary drive assembly 854 relative to drum 1040 of first drive element 922 of secondary drive assembly 856 of FIG. 28. As illustrated, tension wheels 1034 and 1036 are positioned on each side of drum or pulley 1040 and maintain a tension on drive cable 1020 on pulley 1040 as it is driven back and forth by forces F 1030 and F' 1032 to cause rotation of pulley 1040 and, thus, first drive element 922 as indicated by rotational arrow 940. According to one embodiment, tension wheel 1036 is stationary while tension wheel 1034 is biased against drive cable 1020, such as by a spring, and is able to move, as indicated by directional arrow 1070, so as to maintain an adjustable tension on drive cable 1020.

In addition to drive cable 1020, as described above with respect to FIGS. 27 through 31, drive system 850 may be of other configurations as well. For example, in lieu of the loop of drive cable 1020, a different drive loop element, such as a drive chain or drive belt (e.g. a cog belt) may be employed.

Figure 32:
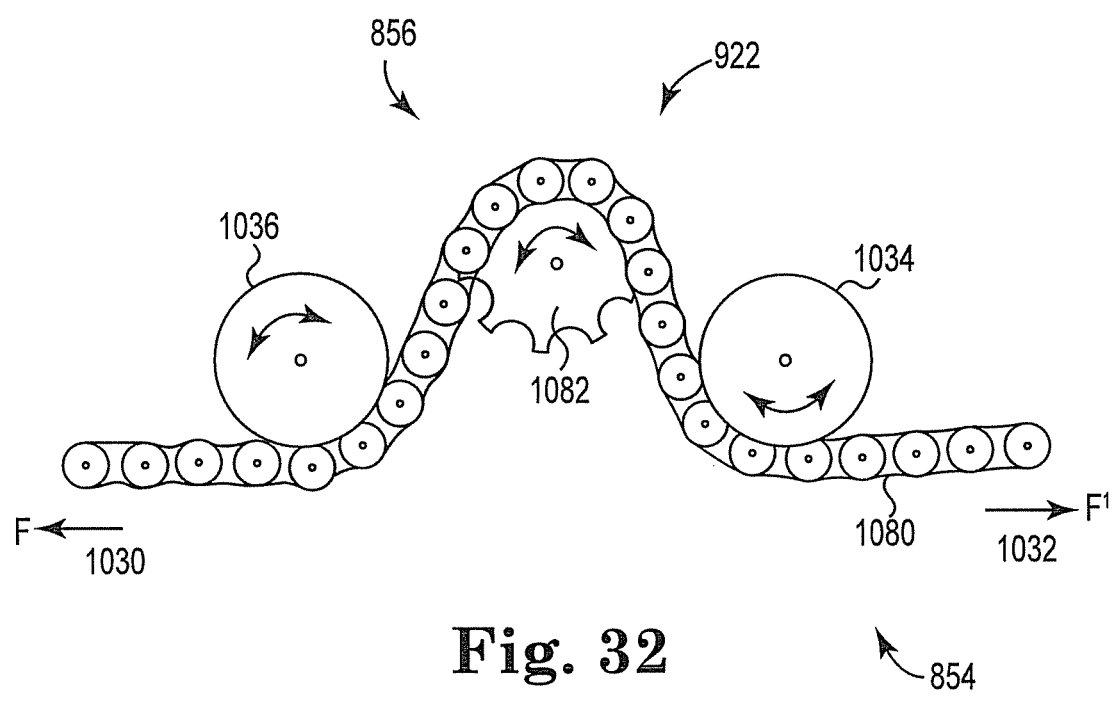
FIG. 32 is a diagram generally illustrating portions of a drive system according to one embodiment.

FIG. 32 is a schematic diagram illustrating portions of primary drive assembly 854 and second drive assembly 856 (according to the embodiment of FIG. 28) employing a drive chain 1080 in lieu of drive cable 1020. As illustrated, in lieu of pulley or wheel 1040, first drive element 922 of second drive assembly 856 employs a sprocket 1082 which engages and is driven by drive chain 1080. Additionally, tension wheels 1034 and 1036 may comprise non-driven idler sprockets as well. Although not explicitly illustrated, with reference to FIG. 27, drive chain 1080 comprises a continuous loop which is routed about at least a portion of mold cavities 46a and 46b of mold assembly 360 using a series of pulleys, guide wheels, sprockets, etc., and is driven by a sprocket coupled to drive source 852 via drive shaft 860. It is noted that when a drive chain is employed, such as drive chain 1080, sprocket 1082 can be employed in lieu of pulleys 1050 and 1060 in the embodiments of secondary drive assemblies respectively illustrated by FIGS. 29 and 30.

Figure 33:
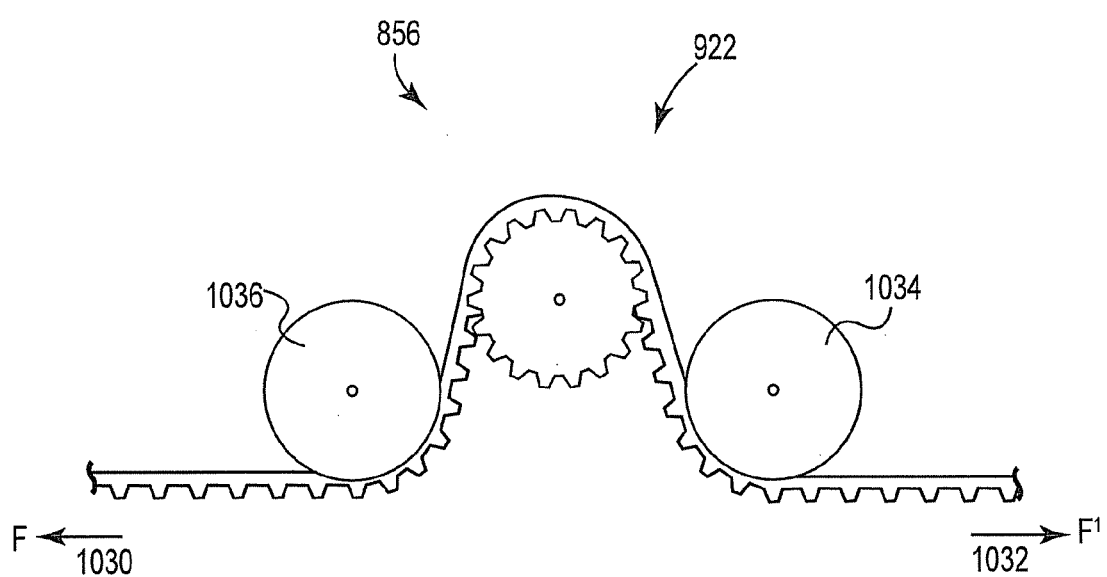
FIG. 33 is a diagram generally illustrating portions of a drive system according to one embodiment.

FIG. 33 is a schematic diagram illustrating portions of primary drive assembly 854 and second drive assembly 856 (according to the embodiment of FIG. 28) employing a drive belt 1090 is lieu of drive cable 1020. As illustrated, in lieu of pulley or wheel 1040, first drive element 922 of second drive assembly 856 employs a gear or toothed drum 1092 which engages and is driven by drive belt 1090. Additionally, tension wheels 1034 and 1036 may comprise non-driven idler gears as well. Although not explicitly illustrated, with reference to FIG. 27, drive belt 1090 comprises a continuous loop which is routed about at least a portion of mold cavities 46a and 46b of mold assembly 360 using a series of pulleys, guide wheels, sprockets, etc., and is driven by a drive wheel coupled to drive source 852 via drive shaft 860. It is noted that when a drive belt is employed, such as cog belt 1090, toothed wheel or drum 1092 can be employed in lieu of pulleys 1050 and 1060 in the embodiments of secondary drive assemblies respectively illustrated by FIGS. 29 and 30.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a mold assembly in an automated dry-cast block machine, the mold including a plurality of liner plates forming a mold cavity, each liner plate forming a perimeter side of the mold cavity, and at least one liner plate being moveable horizontally toward and away from an interior of the mold cavity, the mold cavity having an open top and open bottom in directions which are vertical relative to the movement of the at least one moveable liner plate, the method comprising: driving a master drive element back and forth in a continuous loop about at least a portion of exterior perimeter sides of the mold cavity to provide a first linear force in a first horizontal direction and a second linear force in a second horizontal direction opposite the first horizontal direction substantially in parallel with each perimeter side about which the master drive element is routed; and driving with the first and second linear forces a secondary drive element which engages and drives a first moveable liner plate of the at least one moveable liner plate linearly horizontally toward and away from the interior of the mold cavity, wherein the first and second linear forces driving the secondary drive element are perpendicular to a movement of the first moveable liner plate of the at least one moveable liner plate toward and away from the interior of the mold cavity; wherein the secondary drive element comprises first and second drive elements, the method including: converting the first and second linear forces with the first drive element to rotational forces about an axis of rotation which is normal to a perimeter side on which the secondary drive element is disposed; and driving the second drive element, which is threadably coupled to the first drive element and engages the first moveable liner plate of the at least one moveable liner plate, back and forth along the axis of rotation in response to the rotational forces to drive the first moveable liner plate of the at least one moveable liner plate linearly horizontally toward and away from the interior of the mold cavity.

2. The method of claim 1, including converting movement of moveable components of the dry-cast block machine into drive forces which drive the master drive element back and forth about the continuous loop.

3. The method of claim 1, wherein driving the master drive element comprises driving the master drive element with an electric motor.

4. The method of claim 1, wherein the master drive element comprises a cable.

5. The method of claim 1, wherein the master drive element comprises a chain.

6. The method of claim 1, wherein the master drive element comprises a belt.

\* \* \* \* \*